United States Patent [19]

Czirr et al.

[11] Patent Number: 5,231,290

[45] Date of Patent: Jul. 27, 1993

[54] NEUTRON COINCIDENCE DETECTORS EMPLOYING HETEROGENEOUS MATERIALS

[75] Inventors: J. Bartley Czirr, Mapleton; Gary L. Jensen, Orem, both of Utah

[73] Assignee: Brigham Young University, Provo, Utah

[21] Appl. No.: 899,031

[22] Filed: Jun. 16, 1992

Related U.S. Application Data

[63] Continuation of Ser. No. 563,308, Aug. 7, 1990, abandoned.

[51] Int. Cl.5 .............................................. G01T 3/06
[52] U.S. Cl. ................................ 250/390.11; 250/366; 250/367; 250/369; 250/390.07
[58] Field of Search .................... 250/390.07, 390.11, 250/391, 392, 366, 369, 390.01, 367

[56] References Cited

U.S. PATENT DOCUMENTS

| | | | |
|---|---|---|---|
| 3,233,103 | 2/1966 | Aoki | 250/392 |
| 3,988,586 | 10/1976 | Stuart et al. | 250/367 |
| 4,931,649 | 6/1990 | Czirr et al. | 250/390.07 |

OTHER PUBLICATIONS

Czirr, "A New Technique for Capture and Fission Cross-Section Measurements", Nuclear Instruments and Methods 72 (1969) pp. 23-28.
Jones, et al, "Observation of cold nuclear fusion in condensed matter", Nature, vol. 338, No. 6218, (1989), pp. 737-740.
Jensen, et al, "Gamma-Ray Sensitivity of 6Li-Glass Scintillators", Nuclear Instruments and Methods 205 (1983) pp. 461-463.
Dytlewski, et al, "A Neutron Multiplicity Counter for Plutonium Assay", Nuclear Science and Engineering, 104, (1990) pp. 301-313.
Czirr, et al, "A Neutron Coincidence Spectrometer", Nuclear Instruments and Methods in Physics Research, A284 (1989) pp. 365-369.
Jensen, et al, "A Moderating 6Li-Glass Neutron Detector" Nuclear Instruments and Methods in Physics Research, 220 (1984) pp. 406-408.
Swansen, et al, "Shift-Register Coincidence Electronics System for Thermal Neutron Counters", Nuclear Instruments and Methods, 176 (1980), pp. 555-565.
Drake et al., Nuclear Instruments and Methods in Physics Research, A247 (1986) 576–582; *New Electronically Black Neutron Detectors.*
Menlove et al., Nuclear Technology, vol. 71 (1985) 497–505; *A High-Performance Neutron Time Correlation Counter.*
Aleksan et al., Nuclear Instruments and Methods in Physics Research, A274 (1989) 203–206; *Measurement of Fast Neutrons in the Gran Sasso Laboratory Using a 6Li Doped Liquid Scintillator.*
Ait-Boubker et al., Nuclear Instruments and Methods in Physics Research, A277 (1989) 461–466; *Thermal Neutron Detection and Identification in a Large Volume with a New Lithium-6 Loaded Liquid Scintillator.*
Ewing et al., Nuclear Instruments and Methods in Physics Research, A299 (1990) 559–561; *A Fast-Neutron Detector Used in Verification of the INF Treaty.*
Filchenkov et al., Nuclear Instruments and Methods in Physics Research, A294 (1990) 504–508; *The Parameters of the Full Absorption Neutron Spectrometer.*
Chiles et al., IEEE Transactions on Nuclear Science, vol. 37, No. 3, Jun. 1990; *Multi-Energy Neutron Detector for Counting Thermal Neutrons, High-Energy Neutrons, and Gamma Photons Separately.*
McElhaney et al., IEEE Transactions on Nuclear Science, vol. 37, No. 3, Jun. 1990; Monte Carlo and Experimental Evaluation of BC-454 for Use as a Multienergy Neutron Detector.

*Primary Examiner*—Carolyn E. Fields
*Attorney, Agent, or Firm*—Foley & Lardner

[57] ABSTRACT

A neutron detector relies upon optical separation of different scintillators to measure the total energy and-/or number of neutrons from a neutron source. In pulse mode embodiments of the invention, neutrons are detected in a first detector which surrounds the neutron source and in a second detector surrounding the first detector. An electronic circuit insures that only events are measured which correspond to neutrons first detected in the first detector followed by subsequent detection in the second detector. In spectrometer embodiments of the invention, neutrons are thermalized in the second detector which is formed by a scintillator-moderator and neutron energy is measured from the summed signals from the first and second detectors.

65 Claims, 13 Drawing Sheets

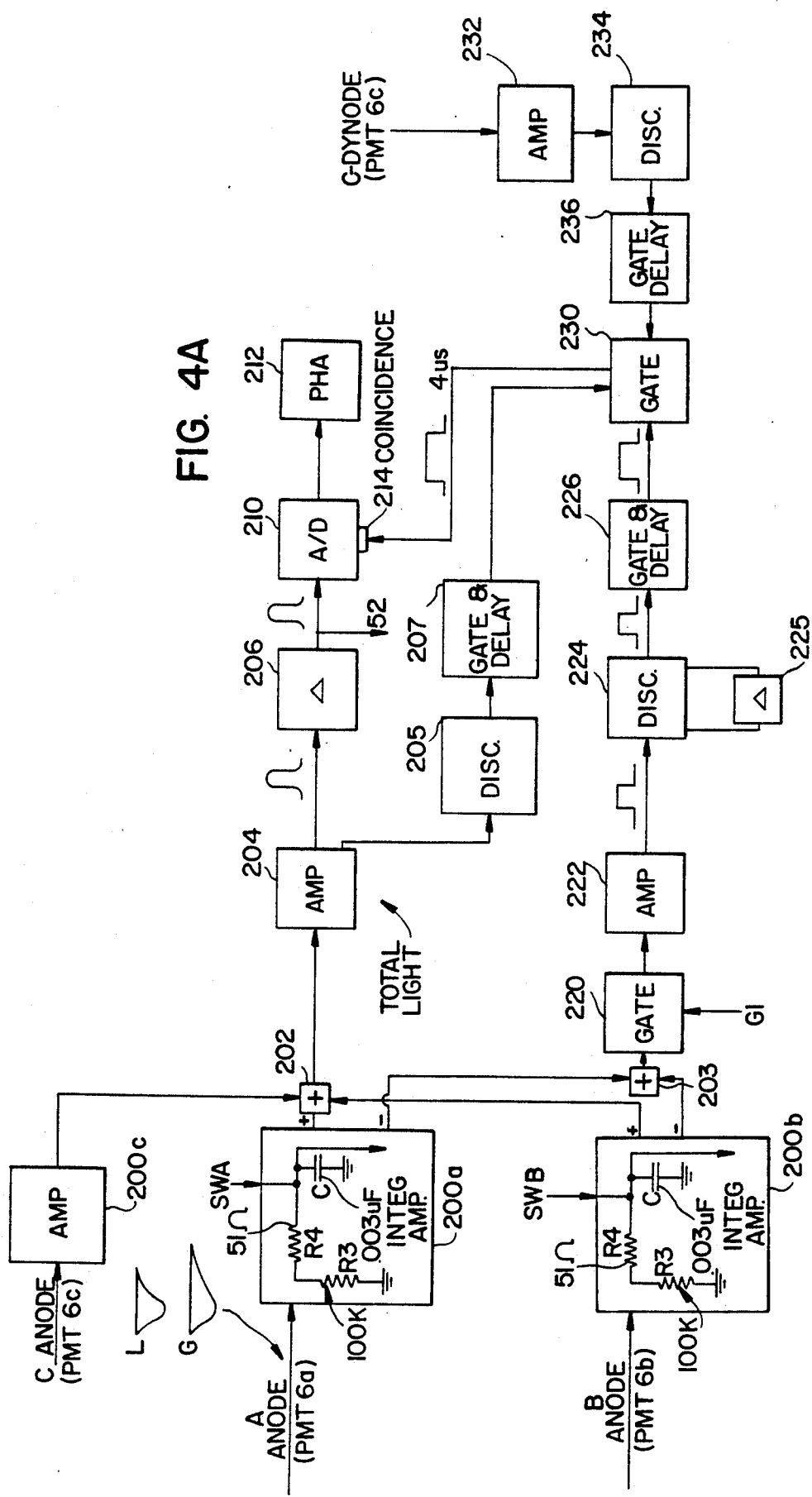

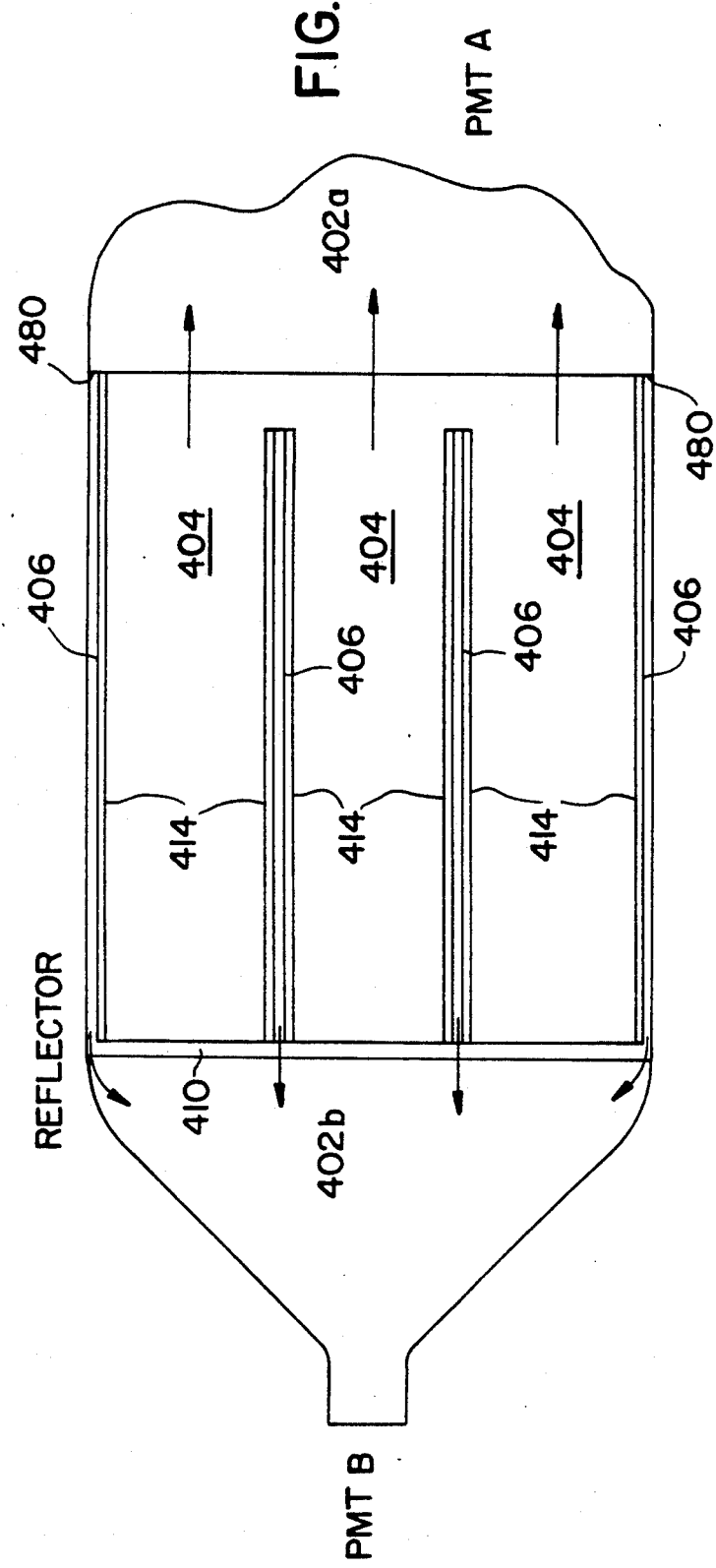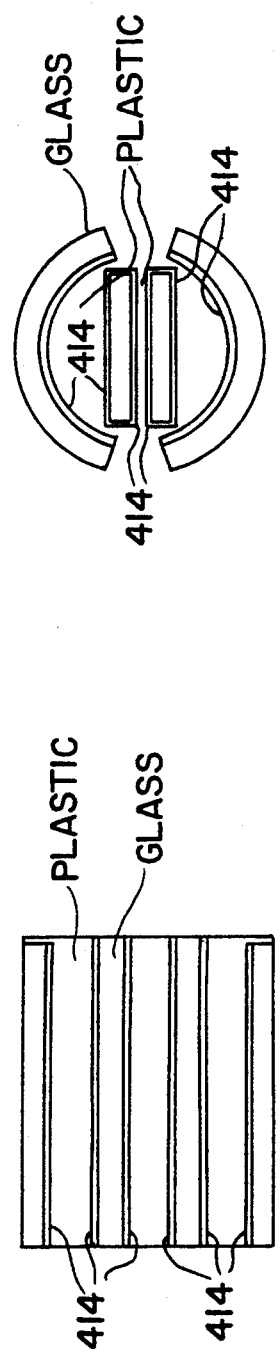

NEUTRON COINCIDENCE DETECTORS EMPLOYING HETEROGENEOUS MATERIALS

This invention was made with Government support under Grants DE-FG02-90ER12105 and DE-FG02-87ER13787 awarded by the Department of Energy. The Government has certain rights in the invention.

This application is a continuation, of application Ser. No. 07/563,308, filed Aug. 7, 1990, now abandoned.

BACKGROUND OF THE INVENTION

The invention is directed to the field of neutron detection and measurement of neutron energies. The invention has special application to technologies where a relatively low neutron flux rate is observed.

Neutron detectors which measure the presence of neutrons, namely neutron flux, as opposed to energy, are known in the art. Examples of such detectors are counters or ionization chambers filled with boron containing gases such as $BF_3$ in which neutrons are detected by the production of ionizing alpha particles when the neutron reacts with boron-10. For fast neutrons, ionization chambers may also be fabricated by utilizing a hydrogenous gas and taking advantage of the elastic scattering of protons which are subsequently utilized to ionize the gas.

When neutron energy measurements are desired, as opposed to flux measurements, the art teaches utilization of time-of-flight methods in which the travel times of individual neutrons are measured, where again the neutrons are detected at the end point by means of an ionization counter.

Since the announcement of "cold fusion" from experiments of Steven E. Jones et al. at Brigham Young University, there has been a demand for neutron counters which can measure neutron energies at very low rates. Such counters are necessary in confirming or refuting the existence of catalyzed fusion in which deuterons are infused into a host material with a resulting enhancement of nuclear fusion. In such systems, detection of the neutrons at the expected energy provides verification of the reaction process and a measure of the reaction rate. One such detector, called a coincidence calorimeter, is described in the inventors prior U.S. Pat. No. 4,931,649 entitled "Neutron Coincidence Calorimeter," incorporated herein by reference.

An interesting observation which has materialized from cold fusion research has been the discovery of neutron "bursts". It is of great interest to measure the number of neutrons in a particular burst as well as their temporal distribution. It is also of interest to measure the energy of neutrons from a low flux source such as from cold fusion sources.

SUMMARY OF THE INVENTION

It is therefore an object of the invention to provide a neutron spectrometer or coincidence calorimeter which is suitable to measure neutron energies without time-of-flight techniques.

A further object of the invention is to provide a neutron spectrometer and/or a flux monitor for measurements of very low neutron fluxes.

Yet another object of the invention is to provide a neutron spectrometer and/or a flux monitor for use in measuring neutrons from cold fusion reactions, such as, for example, reactions utilizing electrolytic cells containing heavy water and having electrodes fabricated, for example, of Ti or Pd. In such cases, the reaction rate may be relatively small and only on the order of 0.1 neutrons per second, and the neutron detector must be able to measure neutrons at a rate of ~0.001 n/sec.

BRIEF DESCRIPTION OF THE DRAWINGS

FIGS. 4a, 4b, 5, 6 and 7 show electronic circuitry in accordance with a spectrometer mode of operation of a second embodiment of the invention;

FIGS. 11a, 11b and 11c illustrate a fourth embodiment of the invention;

DETAIL DESCRIPTION OF PREFERRED EMBODIMENTS

First Embodiment

Figure 1:
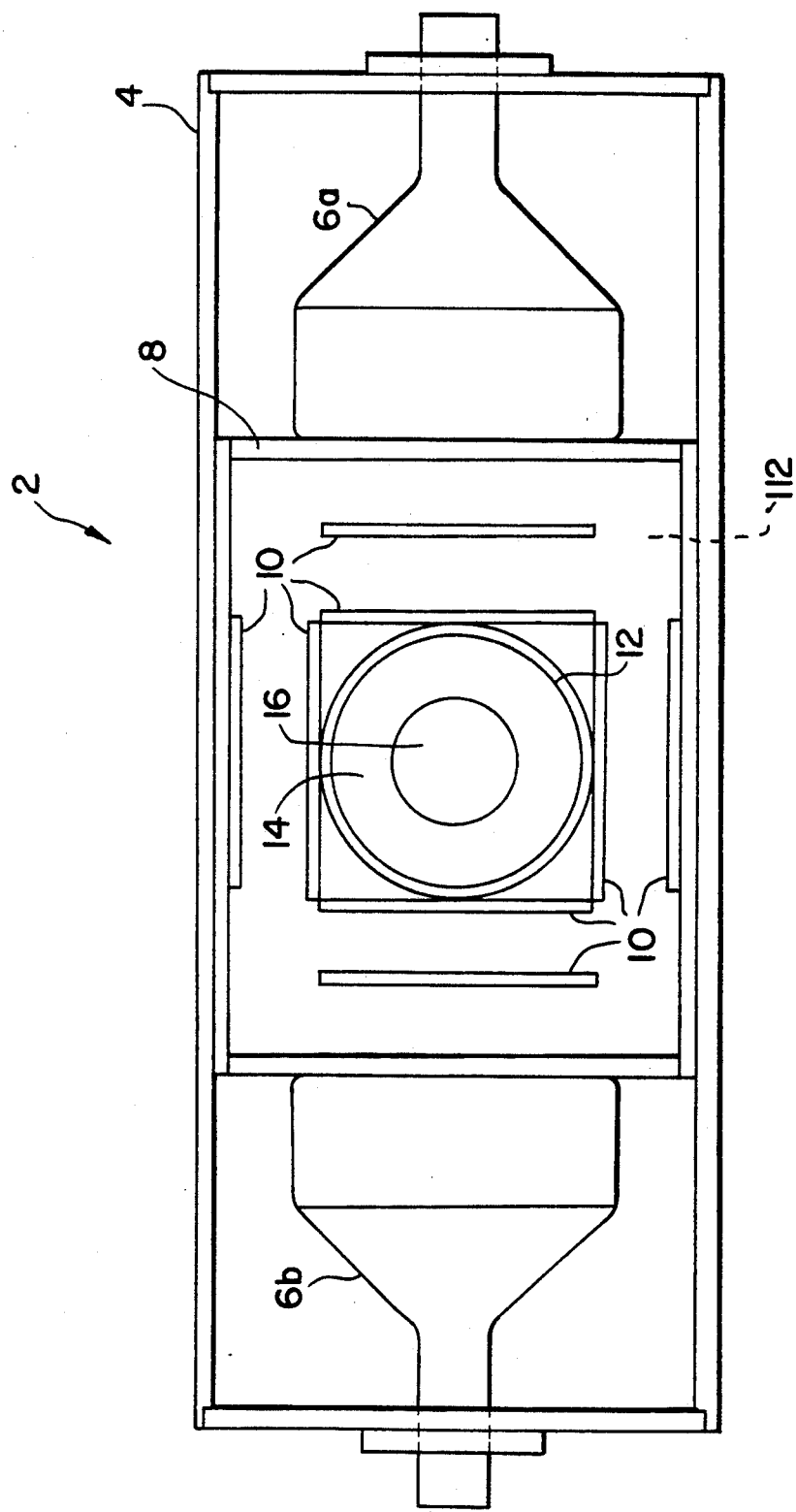
FIGS. 1 and 2 show a plan and side view of a first embodiment of the invention.
Figure 2:
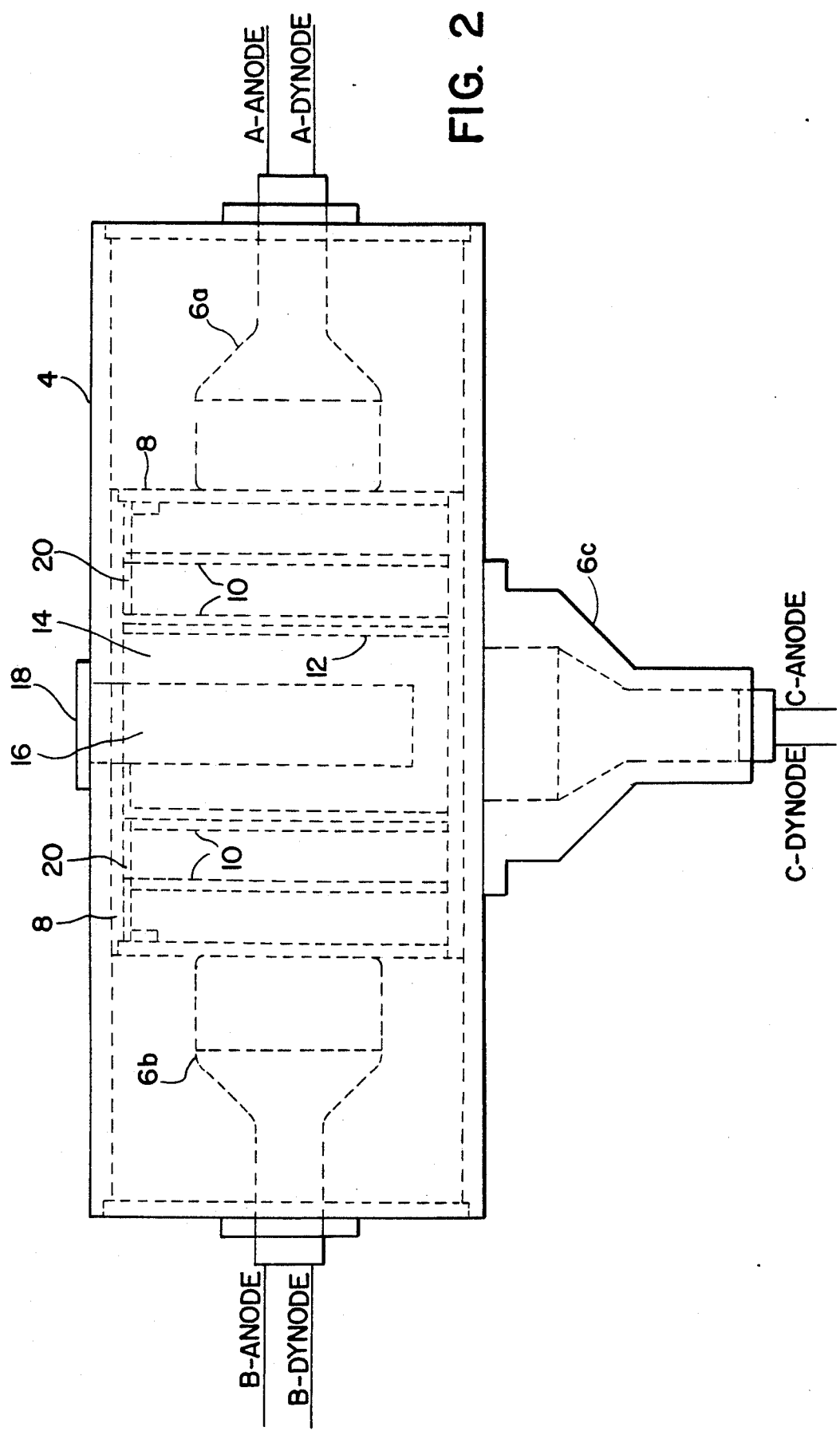
Figure 3:
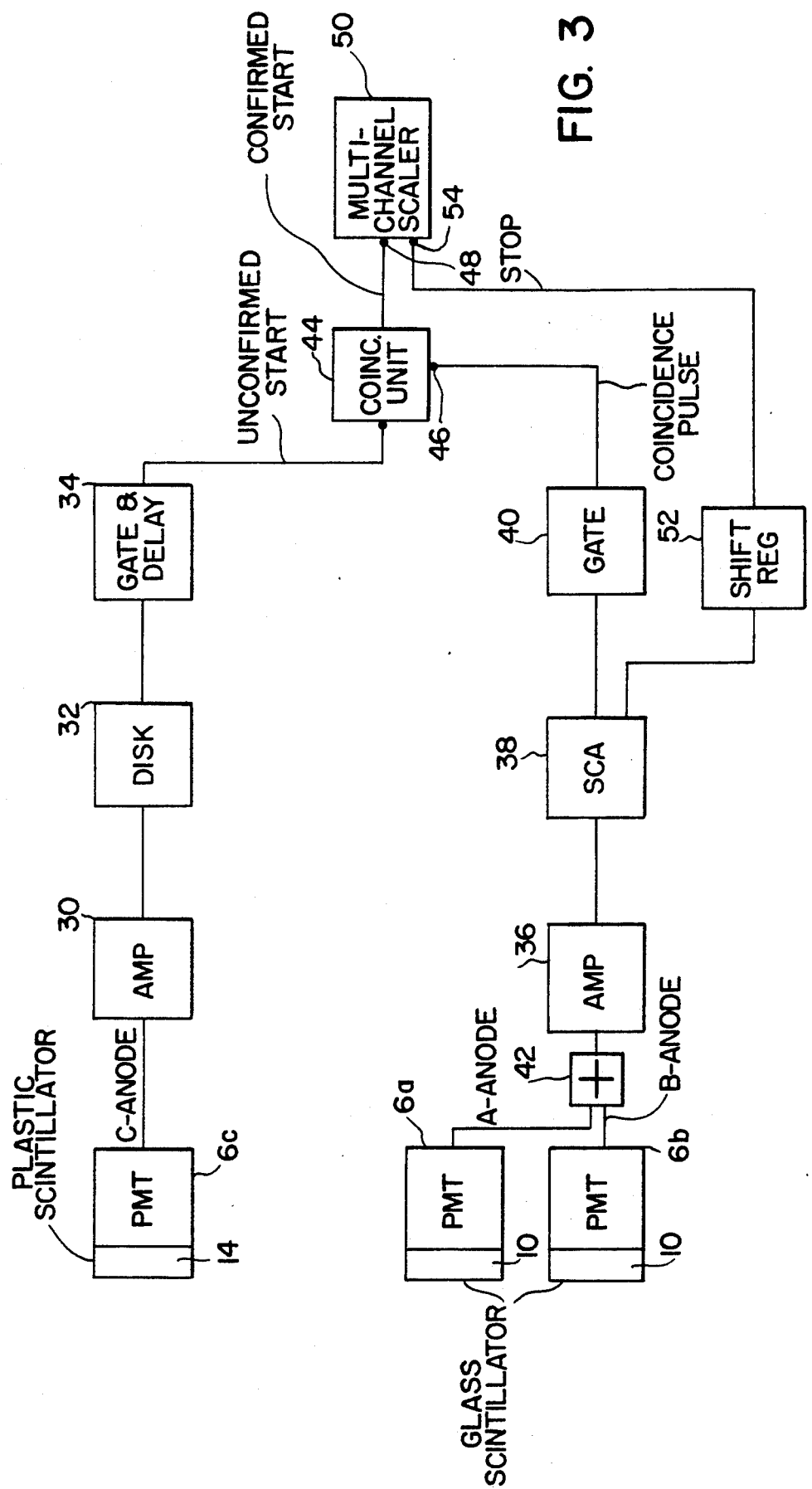
FIG. 3 shows a schematic electronic circuit for processing the signals in accordance with the first embodiment of the invention.

FIGS. 1-3 illustrate a first embodiment of the invention wherein FIGS. 1 and 2 illustrate the geometric arrangement of the detectors and measuring chambers, and FIG. 3 illustrates the electronic processing circuitry. As seen in FIGS. 1 and 2, a detector 2 is provided with a housing 4 having apertures therein for mounting three separate photomultiplier tubes (PMT) 6a, 6b and 6c. Housing 4 may be fabricated, for example, from aluminum metal about ⅛ inch thick. Within the housing 4 there is configured an inner housing 8 fabricated, for example, from Lucite of approximately ¼ inch thick and painted on the outside thereof with a white reflecting paint. The paint of course does not extend to areas adjacent the photomultiplier tubes 6a, 6b and 6c in order to permit these photomultiplier tubes to be optically transparent to the region within the inner housing 8.

Within the region of inner housing 8 there is secured a plurality of glass plates 10. By way of example and not by way of limitation, eight such plates are shown. The plates 10 are Li-6 glass scintillators which have a high cross section for thermalized neutrons, resulting in the generation of tritium and alpha particles with a total energy of 4.8 MeV. Within the center of the region housed by inner housing 8, there is disposed a support cylinder 12 made, for example, from a Lucite tube which is painted on the interior thereof so as to reflect light incident from the exterior of the cylinder 12 back toward the exterior region from whence it came. Within the support cylinder 12 is a cylindrically shaped plastic scintillator 14 which contains a central bore 16 for the placement of a neutron generating source. A fitting 18 may be positioned within the central bore 16, and the neutron source is placed therein. The plastic scintillator 14 is coated on the exterior surface, except in the region of photomultiplier tube 6c, with a reflecting paint so as to reflect light generated within the plastic scintillator 14 back toward the interior of the cylindrical plastic scintillator 14 from whence it came.

A small air gap, not shown, separates the support cylinder 12 from the plastic scintillator 14. Further, a Lucite spacer 20 is utilized to support the glass plates 10 within the region of the interior of the inner housing 8.

The plastic scintillator 14 may more generally comprise any organic scintillator and may include a liquid scintillator. In the case of a liquid scintillator, the liquid is placed in a light transparent housing coated with a reflecting paint, except in the region of the photomultiplier tube 6c, so as to reflect light generated within the liquid back into the liquid from whence it came.

It is important to recognize that the photomultiplier tubes 6a and 6b are responsive to light generated only from the glass plates 10 and do not view any light emanating from the plastic scintillator 14. Conversely, the photomultiplier tube 6c is so configured and arranged as to be responsive only to the light emanating from plastic scintillator 14 and not from the region exterior to the plastic scintillator 14 as, for example, light emanating from the glass plates 10. In this fashion, optical isolation is achieved between the light generated in the plastic scintillator 14 and in the glass plates 10. Such optical isolation greatly simplifies the processing electronics, eliminating much of the pulse shaped discrimination normally required when such isolation is absent.

The region within the interior of the inner housing 8 and exterior to the support cylinder 12 may be filled with a neutron moderator. The moderator may be either a solid or liquid. By way of example, and not by way of limitation, the moderator will hereinafter be referred to as a liquid moderator and may take the form of mineral oil.

In operation, a neutron emanating source (not shown) is placed within the central bore 16 of the plastic scintillator 14. The source may, for example, be a small electrochemical cell such as the one reported by Jones, S. E. et al in *Nature* 338,737-740 (1989) or may be the catalyzed electrodes from such a cell or may be any other neutron source or material for which the presence of neutrons is desired to be measured.

The electronic circuitry utilized in the first embodiment of the invention is shown in FIG. 3 and is seen to comprise a first circuit branch consisting of amplifier 30, discriminator 32, and gate and delay circuit 34; and a second circuit branch consisting of amplifier 36, single channel analyzer 38, and gate 40. The anode output (although the dynode may also be utilized) of photomultiplier tube 6c is connected in the first branch to the input of amplifier 30. Anodes of photomultipliers 6a and 6b are similarly connected to amplifier 36 in the second branch but are first "added" together in a three-way adder 42. Within the first branch of the circuitry of FIG. 3, the output of the gate and delay circuit 34 is fed as an "unconfirmed start pulse" to the linear input of coincidence circuit 44, and the output of gate 40 is fed as a coincidence pulse to a coincidence input terminal 46 of coincidence circuit 44. The output of coincidence circuit 44 is fed as a "confirmed start" pulse to a first input terminal 48 of a multichannel scaler 50. The stop input of the multichannel scaler 50 is provided by the single channel analyzer 38 via a shift register 52 having its output connected to the second input terminal 54 of the multichannel scaler 50.

By way of example, and not by way of limitation, amplifiers 30 and 36 may comprise a timing filter amplifier model 474 supplied by EG&G/ORTEC, discriminator 32 may comprise a lower level discriminator model 583 supplied by EG&G/ORTEC and the gate and delay circuit 34 as well as gate 40 may comprise a gate and delay circuit model 416A supplied by EG&G/ORTEC. The single channel analyzer may be a model 2035 single channel analyzer supplied by Canberra, and the coincidence circuit 44 may be an EG&G/ORTEC model 409 coincidence unit. The multichannel scaler 50 may be a Nuclear Data FMCS.

In operation, the detector of FIG. 2 is utilized to measure the number and temporal distribution of neutrons emanating in bursts from the neutron source. The burst of neutrons emanates from the neutron source placed in the cylindrical bore 16 and generates a large light pulse in plastic scintillator 14. The large light pulse from the plastic scintillator 14 is viewed only by the photomultiplier tube 6c and not by photomultiplier 6a or 6b. The pulse results from protons liberated in elastic collisions with neutrons emanating from the neutron source. These protons deposit their energy within the plastic scintillator generating the light pulse in the process. The neutrons which subsequently escape from the plastic scintillator 14 are moderated in the mineral oil or other suitable moderator within the inner housing 8, and the resulting thermalized neutrons produce scintillations upon being captured in the Li-6 doped glass plates 10. The capture of these thermalized neutrons in the Li-6 glass produces alpha particles and tritium with a total energy of 4.8 MeV, and a second light pulse corresponding to the 4.8 MeV energy is produced in the glass plates. The light generated in the glass plates is collected only in the photomultiplier tubes 6a and 6b and is not seen by the photomultiplier tube 6c.

As a result of the optical isolation between the plastic scintillator photomultiplier tube (photomultiplier tube 6c) and the glass scintillator photomultiplier tubes (photomultiplier tubes 6a and 6b) pulse-shape discrimination, normally required in the absence of such isolation is not needed. The electron circuitry of FIG. 3 is thus relatively simple. The output of the photomultiplier tube 6c, corresponding to the pulse generated in the plastic scintillator 14, is amplified in the amplifier 30 and fed to discriminator 32 which sets a lower level threshold, as for example 1 MeV, to eliminate noise. The discriminated electrical signal is subsequently fed to gate and delay circuit 34 which produces a narrow pulse which is delayed approximately 50 μsec with respect to its input signal. The delayed pulse provides an "unconfirmed start pulse" to the coincidence circuit 44.

In order to provide the confirmation of the start pulse, the second or lower branch in the electronic circuitry of FIG. 3 requires that a total neutron energy of about 4.8 MeV be observed from the neutron capture in Li-6. For this purpose, the output of photomultiplier tubes 6a and 6b is summed in the adder 42 and fed to amplifier 36 and subsequently to the single channel analyzer 38 which is set around a window of the expected glass peak of 4.8 MeV. Thus, assuming pulses are observed in the glass at the expected energy range of 4.8 MeV, a pulse is fed from the single channel analyzer 38 to gate 40, which provides a zero delayed pulse having a width of 50 μsec. The output of gate 40 is utilized to provide the coincidence pulse to coincidence unit 44 at its coincidence input terminal 46.

The output of coincidence unit 44 provides a confirmed start pulse which is fed to the first input terminal 48 of the multichannel scaler 50. This start pulse basically means that a pulse was observed within the plastic scintillator 14 (passing the lower level threshold of discriminator 32), and was followed within a 50 μsec window by at least one stop pulse resulting from thermalized neutron capture within at least one of the glass plates 10. A plurality of neutrons may be observed within the 50 μsec window, and the pulses resulting from these neutrons will be passed from the single channel analyzer 38 to shift register 52 where they will be delayed in a first-in, first-out fashion to provide stop pulses to the multichannel scaler 50. Thus, multichannel scaler 50 provides an indication of the time between each stop pulse and the original start pulse.

The shift register may, for example, be a 64 channel shift register with each channel corresponding to a delay time of one microsecond.

A clock in the multichannel scaler 50 may be utilized to reset the scaler and dump out data onto a storage media (such as a magnetic tape connected thereto) and repeat the process looking for another start pulse with one or more stop pulses associated therewith within a 50 μsec. window. In practice, the shift register 52 must delay pulses input thereto by at least 50 μsec to correspond to the delay of the gate and delay circuit 34. The choice of 64 μsec for the shift register 52 simply means that the zero time reference is set at 14 μsec e.g., if the first stop pulse is observed "immediately" after the start pulse, it will appear as a 14 μsec delayed stop pulse.

As may be appreciated, the detector 2 in accordance with the first embodiment of the invention, can not only measure the number of neutrons within a burst, but can also determine the temporal distribution of the neutrons, since their temporal spacing relative to the start pulse is stored in the multichannel scaler 50. Such information can provide valuable clues to the mechanism of the cold fusion process.

Events which result in simultaneous generation of light in the plastic scintillator 14 and in the glass scintillator plates 10 or the liquid moderator, as for example from cosmic rays, may be eliminated by reducing the length of the gate 40 output to be slightly less than the delay of the unconfirmed start output provided by gate 34, or by including an anticoincidence signal to coincidence unit 44.

The first embodiment of the invention may be modified by replacing the moderator/glass-scintillator portion of the detector (i.e., that portion exterior to the plastic scintillator 14) by a neutron detector which will moderate and subsequently capture neutrons in a detectable exothermic reaction. An example of such a detector is the well known array of He-3 or B-10 filled proportional counters embedded in a hydrogenous moderator such as polyethylene. The electronics portion of this version of the invention is essentially the same as set forth in FIG. 3. It is important to note that the electronics as shown in FIG. 3 is designed to detect a neutron originating from the plastic scintillator and subsequently being moderated and detected in the second neutron detector surrounding the central scintillator. The same neutron is thus detected, first in the central detector (the plastic scintillator) and secondly in the surrounding detector (either a moderator/proportional counter or a moderator/scintillator).

Second Embodiment

A second embodiment of the invention utilizes a similar physical arrangement as shown in FIGS. 1 and 2 but replaces the moderator within the inner housing 8 with an organic scintillator such as, by way of example and not by way of limitation, a liquid or plastic scintillator indicated at 112 in FIG. 1. In the following description, the scintillator will be referred to as a liquid scintillator 112, but it is understood that in each instance a plastic scintillator could alternately be used, and more generally any type of organic scintillator could be employed. The organic scintillator in combination with the Li-6 glass plates 10, permits not only the number of neutrons to be measured within, for example, a neutron burst, but also the energy of these neutrons. In practice, the second embodiment of the detector is utilized in either a burst mode or a spectrometer mode separately or in both modes simultaneously.

Spectrometer Mode of Second Embodiment

In the spectrometer mode, neutron detector 2 may generate one light pulse in the inner plastic scintillator 14 and two light pulses within inner housing 8 and exterior of the inner plastic scintillator 14 from a single incident neutron. Of the two possible light pulses produced exterior to plastic scintillator 14, a first light output is produced by the moderation of the incident neutron in the liquid scintillator 112. The second light output is produced by neutron capture of the thermalized neutrons in the Li-6 doped glass scintillator plates 10. In the liquid scintillator 112, the incident neutron is slowed down to thermal energies by elastic collisions with protons within the liquid scintillator. A large fraction of the incident energy is typically lost after 6 to 10 collisions which take place within a total time of a few nanoseconds. The integrated light from all of the protons give rise to a single light pulse which is viewed by the photomultiplier tubes 6a and 6b. After the neutrons have slowed down within the liquid scintillator 112 to thermal energies, the thermalized neutrons are subsequently captured in the Li-6 glass scintillators plates and generate tritium and alpha particles causing the generation of a second light pulse in the glass scintillator plates 10. The characteristic light from the glass scintillator plates 10 provide a signature that an event occurred in which all of the energy in the neutron was deposited in the detector 2.

The electronics which processes the signals taken from the neutron detector 2 is governed by the logic requirement that only liquid events which fall within a preselected gate time prior to a pulse identified as a neutron capture event are actually counted and measured. Thus, the conditioning electronics is sensitive to the total energy of the neutron resulting in two characteristic pulses of light occurring within a predetermined coincidence time. The coincidence requirement is designed to reduce background counts resulting from gamma rays to which the liquid scintillator 112 is also sensitive. Thus, the electronics, through pulse-shape discrimination, is able to distinguish a glass-produced light event, having a relatively long decay time of about 70 nsec, from a liquid-produced event having a relatively short decay time of about 5 nsec.

Each of the photomultiplier tubes 6a, 6b and 6c produces an anode and a dynode signal. As shown in FIG. 4A, the anode signals from photomultiplier tubes 6a, 6b and 6c are fed respectively to integrating amplifiers 200a and 200b and amplifier 200c. Integrating amplifiers 200a and 200b may, for example, be stretcher amplifiers AN105 supplied by EG&G/ORTEC, and amplifier 200c may, for example, be a model 474 supplied by EG&G/ORTEC. The integrating amplifiers 200a and 200b are coupled to grounding switches to enhance integration time characteristics as will be explained hereinbelow. The positive outputs of integrating amplifiers 200a and 200b and amplifier 200c are fed to a summer 202 and the summed output is supplied to an amplifier 204 which may, for example, be an EG&G/ORTEC linear amplifier model 572 having both unipolar and bipolar outputs. The unipolar output of amplifier 204 is fed to a delay amplifier 206, as, for example, EG&G/ORTEC 427A. Plural delay amplifiers composed of series connected EG&G/ORTEC 427's may be used to give the desired delay time. The delay amplifier 206 supplies a 25 μsec delay and subsequently feeds the signal to an analog to digital (A/D) converter 210. The output of the A/D converter is fed to a pulse height analyzer 212. The A/D converter 210 performs the digital conversion of the incoming analog signal from the delay amplifier 206 only upon receipt of a gating or coincidence signal fed to a coincidence input terminal 214.

The bipolar output from amplifier 204 is fed to discriminator 205 which may, for example, be an EG&G/ORTEC integral discriminator model 421. The output of discriminator 205 is fed into a gate and delay generator 207, which may, for example, be an EG&G/ORTEC model 416A. The output of the gate and delay generator 207 is a logic pulse of 4 μsec width and having a delay of 25 μsecs. This output is fed into the linear input of a coincidence circuit 230 which may, for example, be a gate and slow coincidence module, EG&G/ORTEC model 409. The coincidence circuit 230 operates as a coincidence unit. The output of the coincidence circuit 230 in turn is fed as a coincidence signal to the coincidence input terminal 214 of the A/D converter 210, but only if required coincidence signals are present, as explained below.

The negative outputs of integrating amplifiers 200a and 200b are fed to a summer 203. The output of summer 203 is then fed to a gate 220, as, for example, a linear gate LG101 supplied by EG&G/ORTEC. The output of gate 220 is fed to an amplifier 222 such as EG&G/ORTEC timing filter amplifier model 474. The output of the amplifier 222 is in turn fed to a discriminator 224 coupled with a delay 225 of a 10 nsec period to supply a narrow output logic pulse signal to gate unit 226. The discriminator 224 may, for example, be an EG&G/ORTEC model T101 and the gate unit 226 may be EG&G/ORTEC model GG100. The output of the gate unit 226 is fed to a coincidence input of a coincidence circuit 230 via a 10 db attenuator, not shown.

The dynode of photomultiplier 6c is fed via amplifier 232 and discriminator 234 to gate and delay circuit 236 which provides a logic pulse of width 4 μsecs delayed such that the logic pulse is in coincidence with the output of gate and delay generator 207. This logic pulse from gate and delay circuit 236 is fed as a coincidence input to coincidence circuit 230. Elements 232, 234 and 236 are similar in structure and function to elements 30, 32 and 34 respectively of FIG. 3. Coincidence circuit 230 provides an output similar to the input from gate and delay generator 207 only when simultaneously receiving pulses from gates 207, 226 and 236.

In this fashion, an additional coincidence requirement is established to ensure that essentially simultaneous pulses are first seen in the plastic scintillator 14 and the liquid scintillator 112, followed within 25 μsec by an appropriate pulse in one of the glass scintillators 10.

It is noted that elements 232, 234 and 236 are optional within the embodiment of FIG. 4A and need not be present. If these elements are present, the additional coincidence required from the pulses of the plastic scintillator 14 will result in a very low background detector but with a corresponding low efficiency. Without the additional coincidence, a higher efficiency detector will be achieved but with a resulting higher background. Clearly, a switch may be positioned between gate and delay circuit 236 and coincidence circuit 230 so as to easily optionally insert or disconnect this additional coincidence requirement as the operator desires.

Figure 4B:
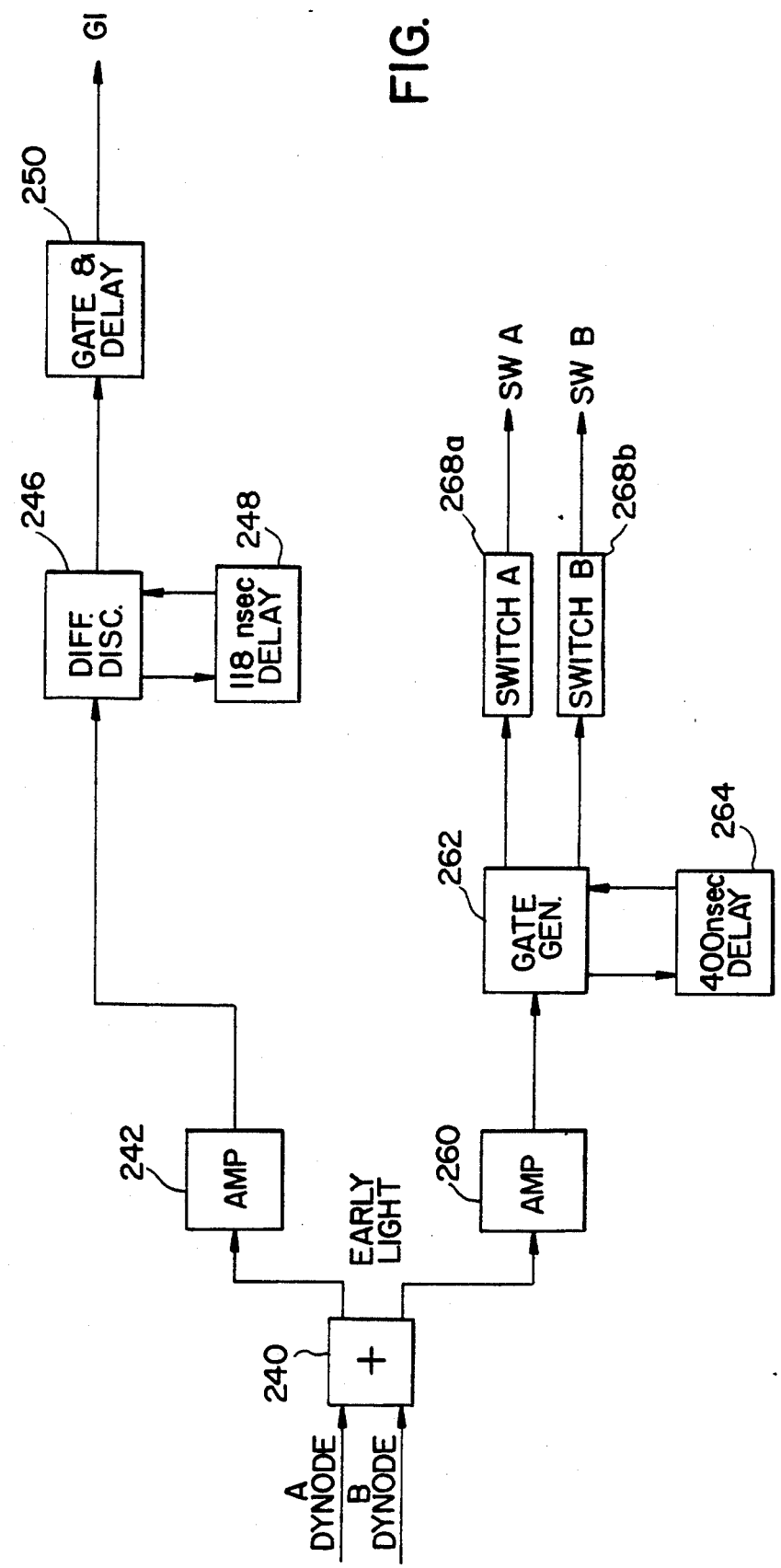

In reference to FIG. 4B, the A and B dynode outputs of photomultiplier tubes 6a and 6b respectively are fed to a summer 240 which provides a summed output to amplifier 242 which may be, for example, an EG&G/ORTEC timing filter amplifier model 474. The output of the amplifier 242 is fed to a differential discriminator 246 coupled to a 118 nsec delay 248. The differential discriminator 246 may, for example, be EG&G/ORTEC model TD101/N. The output of the differential discriminator 246 is fed to a gate and delay circuit 250 such as, for example, EG&G/ORTEC model 416A. The output of gate and delay 250 supplies a signal along line G1 as the gating input signal to gate 220 of FIG. 4A.

The summed output of summer 240 is also fed to an amplifier 260 which may be, for example, EG&G ORTEC model AN101. The output of amplifier 260 is in turn fed to a gate generator 262 which is coupled to a 400 nsec delay 264. The gate generator 262 may, for example, be an EG&G/ORTEC model T101 discriminator. The output of the gate generator 262 is fed to a grounding switch 268a and to an identical grounding switch 268b. Grounding switch 268a supplies output signals along line SW A to a conditioning input of integrating amplifier 200a. Similarly, the output of grounding switch 268b supplies a signal along signal line SW B as a conditioning signal to integrating amplifier 200b.

Figure 5:
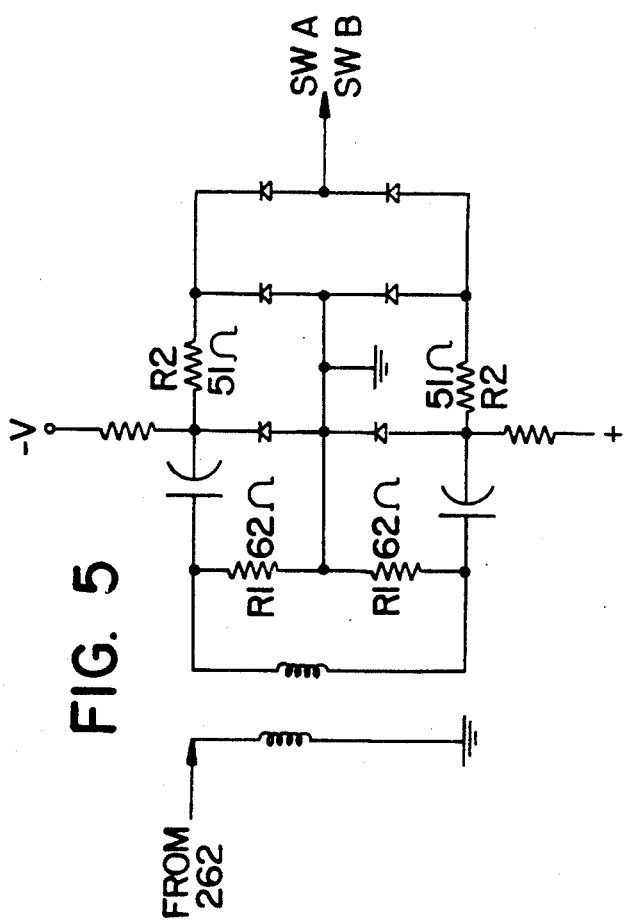

A schematic diagram of the grounding switches 268a and 268b is illustrated in FIG. 5. Normally conductive matched diodes provide a low impedance path to ground permitting a relative fast RC integrating time constant through the R2=51 ohm resistor of the grounding switch 268a (268b). Upon application of the 400 nsec gate signal from the gate generator 262, the switch becomes non-conductive for a set period of time (~400 nsec) thereby providing a high impedance path through the (R3)(C) (R3=100K ohm) network of the integrating amplifier 200a thus producing a relatively long integrating time on the order of 300 μsec. The ground switch is also shown in FIG. 2 of the article entitled "A New Technique for Capture and Fission Cross-Section Measurements" appearing in *Nuclear Instruments and Methods*, Volume 72, pages 23–28, 1969, by J. B. Czirr, incorporated herein by reference.

In operation, the block diagram of FIGS. 4A and 4B is seen to contain a first branch (FIG. 4A) which may be termed the "total light" branch and a second branch (FIG. 4B) which may be termed the "early light" branch. In the "total light" path of FIG. 4A, the incoming light signal is fully integrated in amplifiers 200a, 200b and 200c. The outputs of amplifiers 200a, 200b and 200c are summed in the summer 202 and subsequently amplified in amplifier 204 which also provides pulse shaping. The shaped output of amplifier 204 is delayed by delay amplifier 206 which provides a 25 μsec delay prior to feeding the analog signal to the A/D converter 210. If the coincidence signal is present at the coincidence input terminal 214 of the A/D converter 210, the digital conversion takes place, and the digitized output signal is fed to the pulse height analyzer 212 thereby providing a measure of the total light energy supplied to the photomultiplier tubes. This total light output is proportional to the integrated output from the light pulses produced by the incident neutron in the plastic scintillator 14 and in the liquid scintillator-moderator 112. Since the light pulse produced by thermal neutrons in the glass scintillator plates 10 is constant, it need not be stored in the pulse height analyzer. As explained below, the glass event is not gated into the A/D converter 210 so it never gets digitized. Thus, a measure of the integrated light output produced in the plastic scintillator 14 and the liquid scintillator 112 during the thermalizing of the incident neutron provides complete information as to the incident neutron energy.

The gating signal supplied to the coincidence terminal 214 of the A/D converter 210 is generated by coincidence circuit 230. The linear input to coincidence circuit 230 is derived from discriminator 205 through gate and delay 207 such that only pulses from amplifier 204 with amplitude above a chosen minimum are analyzed. Furthermore, a pulse from gate 226 is required to get an output pulse from coincidence circuit 230, and this pulse arises from the lower branch in FIG. 4A. This lower branch is fed by summer 203 and comprises the gate 220, amplifier 222, discriminator 224, and gate 226. The purpose of the above-mentioned circuits, together with certain elements of FIG. 4B, is to determine whether the incoming light was produced from the liquid scintillator 112 or from the glass scintillator 10. Inasmuch as it is only desired to store the summed pulse from the liquid scintillator 112 and the plastic scintillator 14 if the summed pulse is followed within a predetermined time period (25 μsec) by a characteristic neutron capture event from the glass scintillator 10, the summed signal is delayed in delay amplifier 206 to permit sufficient time for the subsequently generated signal to be produced in the glass scintillator 10.

An additional coincidence requirement to reduce background while also lowering the overall detector efficiency may also be employed by requiring an additional coincidence input to coincidence circuit 230 from gate and delay 236. This requires that the pulse amplitude of the pulse from the plastic scintillator 14 be above a predetermined minimum.

FIG. 4B shows the "early light" branch which is also utilized to differentiate between light generated in the liquid scintillator 112 and the glass scintillator 10. Elements at 242, 246, 248 and 250 are utilized to select through early light amplitude criteria those events which correspond to neutron capture in the glass scintillator 10. The output of the summer 240 is fed to the amplifier 242 which is operated with a fast integration time of 20 nsec. The term "early light" is used to characterize this branch (FIG. 4B) since the integration time of amplifier 242 is much shorter than that of amplifiers 200a and 200b. The output of amplifier 242 is then fed to the differential discriminator 246. This differential discriminator 246 selects a region in the pulse height of the incoming signal corresponding to glass events which have an intensity corresponding to neutron capture in the Li-6. Gamma ray background events may also fall within the selected pulse height window. However, the "total light" from these gammas will be considerably less than that from neutron capture in the glass because of the relatively longer decay time of the pulses in the glass. Thus, even though such gammas will pass through differential discriminator 246 and gate and delay circuit 250 so as to trigger the linear gate 220 (FIG. 4A), they will be eliminated by means of the discriminator 224 which selects only a certain upper portion of the energy spectrum from the "total light" spectrum input thereto as shown in FIG. 7.

Figure 7:
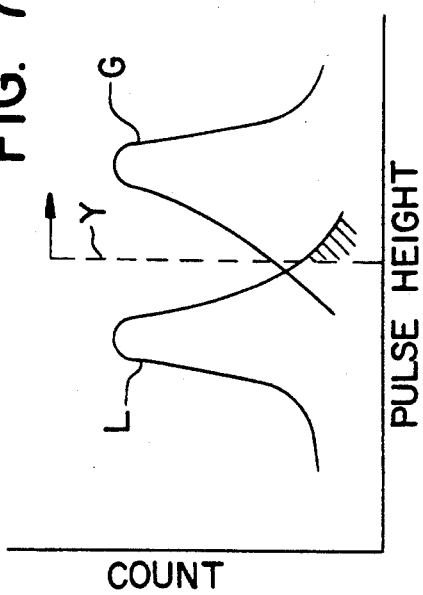

FIG. 7 illustrates the pulse height versus count spectrum which is representative of the total light provided from both glass and liquid scintillator events as a result of the gating of gate 220. This spectrum contains the neutron capture events from the glass, labelled G in FIG. 7, and the gamma background labelled L. The spectrum is fed as an input to the discriminator 224. Both of these events will pass the gate 220 since the conditioning signal along line G1 is, as explained above, set along a narrow pulse height band for the "early light" for which glass and liquid events look quite similar. However, setting the discriminator level 224 to pass only the glass events (above the dotted line Y of FIG. 7) ensures that gate 226 generates the 25 μsec coincidence pulse to coincidence circuit 230 and subsequently to coincidence terminal 214 only if the "total light" deposited in the glass scintillator 10 is above a predetermined value (corresponding to neutron capture.) Gamma peaks in the total light spectrum will be well below the glass peak for neutron capture in the glass scintillator 10 and thus may be effectively eliminated in the discriminator 224. In this fashion, the pulse height analyzer 212 sees only those peaks which correspond to a liquid event which is followed within 25 μsec by a glass event characteristic of neutron capture in the glass scintillator 120.

Figure 6:
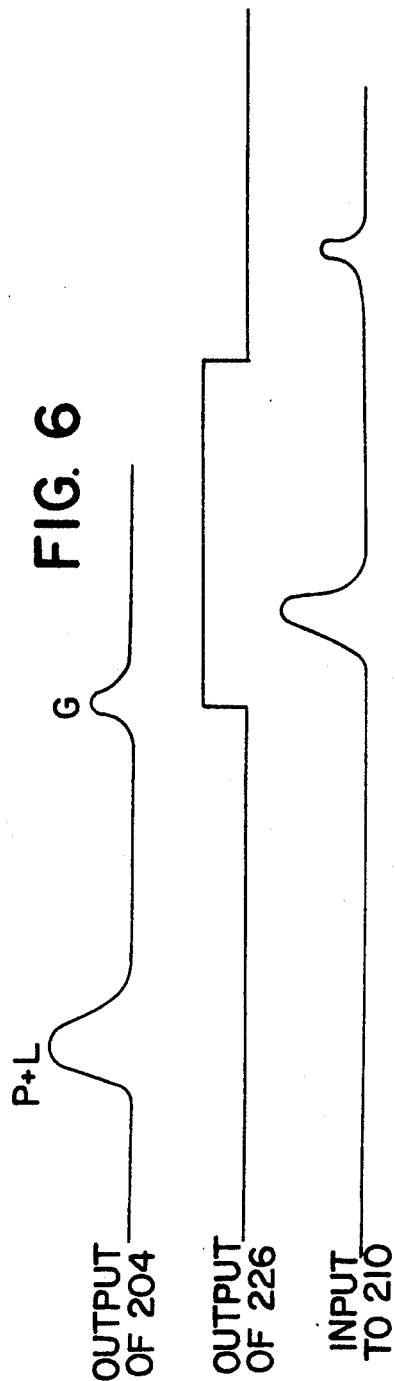

FIG. 6 is illustrative of the timing requirements of the discrimination circuit discussed above. In particular, the "total light" output of amplifier 204 is illustrated in the upper graph of FIG. 6. The symbol "P+L" stands for light from the plastic and liquid scintillators respectively which appears as a superimposed pulse, and the symbol "G" stands for light from the glass scintillator. It is noted in passing that the normal time spread between the generation of the light from the liquid scintillator 112 and the glass scintillator 10 is in the range of 0.1 μsec to 50 μsec with the majority of pulses appearing within a 25 μsec window. Thus, the 25 μsec coincidence requirement ensures that most events will be counted assuming that the neutron is thermalized and subsequently captured in the glass scintillator.

Referring once again to FIG. 6, the initial output of amplifier 204 corresponding to a summed plastic and liquid event, P+L, is delayed in the delay 206 so as to permit analysis of the subsequently received glass event, G. If the subsequently received "early light" glass signal passes the differential discriminator test of differential discriminator 246 and the subsequent "total light" discrimination test of discriminator 224, the second event is determined to be that of a captured neutron in the glass scintillator 10. As such, a 25 μsec pulse is generated by the pulse stretcher 226 which allows the narrow pulse from unit 207 to be passed via coincidence circuit 230 to the coincidence input terminal 214 of A/D converter 210. The summed delayed initial light, P+L, now passes from the delay 206 to the analog input of the A/D converter 210 and is subsequently digitized and stored in the pulse height analyzer 212. It is noted that the subsequent "total light" of the glass event, which is also subsequently fed to A/D converter 210 is not digitized by the A/D converter 210 inasmuch as the gating coincidence signal from coincidence circuit 230 is terminated so as to inhibit operation of the A/D converter. The glass event arises from neutron capture of thermalized neutrons and thus produces a constant energy which need not be recorded since it is the same for all incident neutron energies. Thus, it is only the incident neutron energy deposited in the liquid scintillator-moderator 112 and the plastic scintillator 14 which needs to be measured and which is indicative of the neutron energy.

Burst Mode of Second Embodiment

Figure 8:
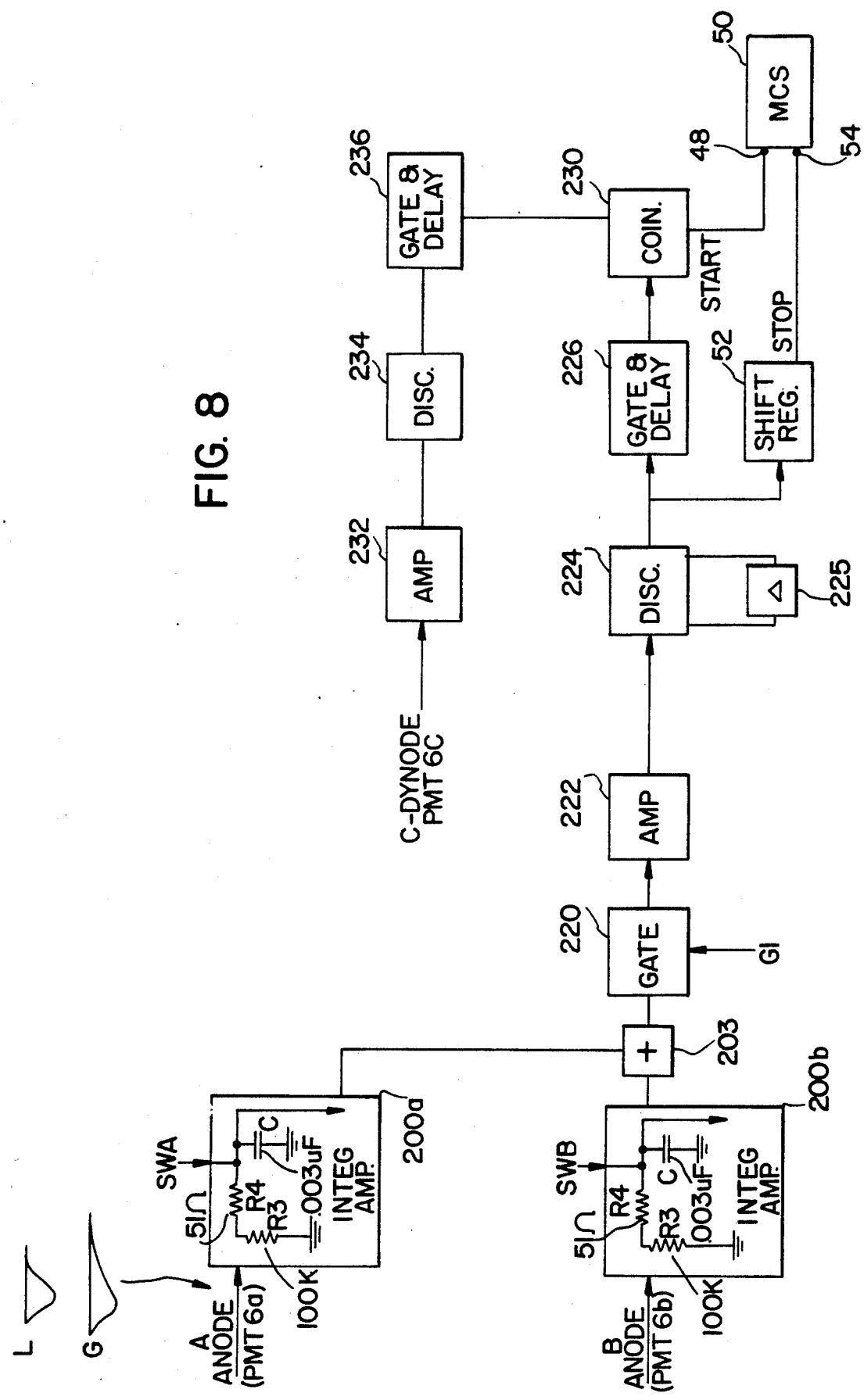
FIG. 8 shows electronic circuitry for a burst mode of operation of a second embodiment of the invention.

The burst mode for the second embodiment of the invention utilizes similar electronics as that shown in FIG. 3 but must employ pulse shape discrimination in order to distinguish between light from the liquid scintillator 112 and glass 10 in a similar manner as illustrated in FIG. 4A. Thus, this mode of operation of the second embodiment of the invention may be understood in reference to FIG. 8 which is similar to FIG. 4A but omits the upper (total light) branch. Furthermore, the output of gate and delay 236 is now used as the linear input to the coincidence circuit 230 which now operates similarly to coincidence unit 44 in FIG. 3. This output of gate 236 is narrow (500 nsec) and is delayed by 50 $\mu$sec. The output of gate 226 is undelayed and has a gate width of 0.25 $\mu$sec less than the delay (50 $\mu$sec) in the output of gate 236. The result of such a modification of FIG. 4A is that the output of coincidence circuit 230' corresponds to a logic signal generated only after a confirmation that a glass event has taken place (neutron capture in the glass) preceded by an appropiate plastic scintillator event passing a lower level discriminator (discriminator 234). The plastic scintillator event corresponds to the slowing down of neutrons in the plastic scintillator 14. Thus the output of coincidence circuit 230 is fed to the start input 48 of multichannel scaler 50. The output of discriminator 224 is also fed into a shift register 52 which provides a delay of 64 $\mu$sec. The output of shift register 52 is fed into the stop input 54 of multichannel scaler 50.

In this embodiment, therefore, the amplifier 36 and single channel analyzer 38 of FIG. 3 are not utilized and are effectively replaced by gate 220 and amplifier 222 plus most of the circuitry illustrated in FIG. 4B. Note that the circuitry illustrated in FIG. 4B is therefore utilized in combination with FIG. 8 in a similar fashion as explained above in connection with the description of FIGS. 4A and 4B.

It is further noted that the embodiments described above could also be modified to employ only a single detector or photomultiplier tube to measure the radiation from the organic scintillator and the Li-6 glass plates. In this modification, a total of two photomultiplier tubes would be employed. The electronic for analyzing the signals would generally follow as explained above but only a single amplifier 200a, 200b would be employed as would be readily apparent to those skilled in the art.

Third Embodiment

Figure 9:
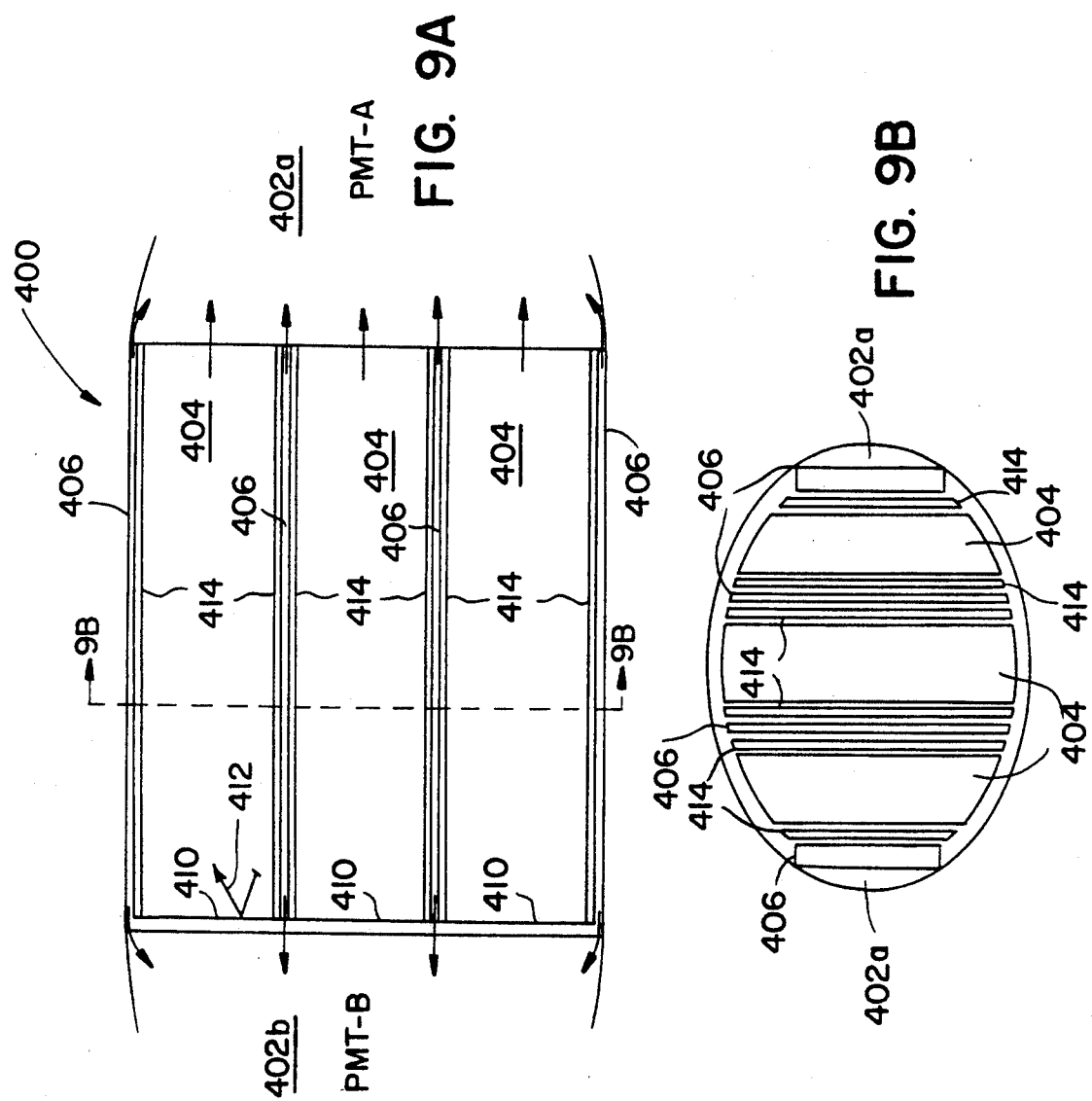
FIGS. 9a and 9b illustrate a third embodiment of the invention.
Figure 10:
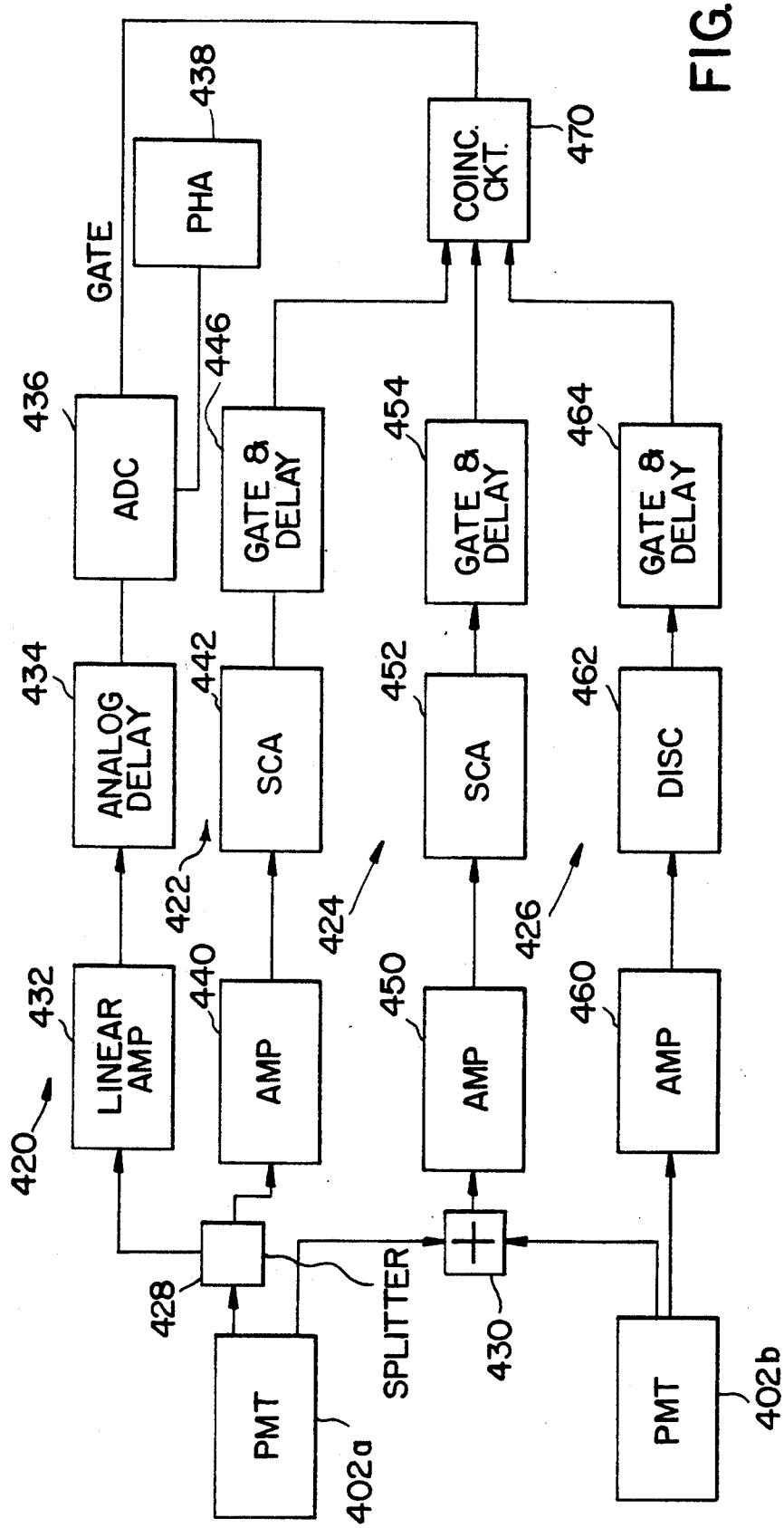
FIG. 10 shows electronic circuitry for processing signals in accordance with the third embodiment of the invention.

A third embodiment of the invention is illustrated in FIGS. 9A, 9B and 10. As seen in FIGS. 9A and 9B, a detector 400 utilizes two photomultiplier tubes 402a and 402b. The detector 400 further comprises a plastic scintillator region and Li-6 glass plate scintillator region. The plastic scintillator region may be formed by a plurality of plastic scintillators 404 and the glass region may be formed by a plurality of glass plates 406. One end surface of the plastic scintillators 404 is provided with a reflecting coating or reflecting surface 410 so as to reflect light incident thereon back into the region of the plastic scintillators from whence it came. In the embodiment of FIG. 9A the reflecting surface 410 is positioned on the side of the plastic scintillator facing the photomultiplier tube 402b. Light reflecting off the surface 410 is illustrated by the arrow 412. It may thus be seen that the photomultiplier tube 402a receives scintillator light from both the plastic scintillators 404 and the glass scintillator plates 406. However, the photomultiplier tube 402b receives light only from the glass scintillator plates 406 inasmuch as the light from the plastic scintillators 404 is blocked from entering photomultiplier tube 402b by means of the reflecting surface 410.

Additionally, the plastic scintillators 404 and glass scintillator plates 406 are optically separated from one another as by means of a reflecting coating 414 or material so that light generated in one scintillator 404 (406) is not transmitted to the other scintillator 406 (404).

The electronics utilized in conjunction with the detector shown in FIGS. 9A and 9B is illustrated in FIG. 10. FIG. 10 is seen to comprise four circuit branches labeled 420, 422, 424, and 426. Photomultiplier tube 402a feeds branches 420 and 422 through splitter 428. Photomultiplier tube 402b feeds branch 426. Through summer 430, photomultiplier 402a and 402b both feed branch 424.

Circuit branch 420 comprises amplifier 432, analogue delay 434, analog to digital converter 436 and pulse height analyzer 438. Circuit branch 422 comprises amplifier 440, discriminator 442 and gate and delay circuit 446. Circuit branch 424 comprises amplifier 450, single channel analyzer 452 and gate and delay circuit 454. Circuit branch 426 comprises amplifier 460, discriminator 462 and gate and delay circuit 464. The output of the gate and delay circuits 446, 454 and 464 are fed to a coincidence circuit 470. The output of the coincidence circuit 470 serves as a gate to the analogue to digital converter 436.

The circuit branch 420 provides the path for measuring the energy of the neutrons emitted from the source that is desired to be measured. It is noted that only photomultiplier tube 402a is responsive to the plastic scintillator light, and only the energy associated with the plastic scintillator is needed to define the total neutron energy inasmuch as the glass capture event always corresponds to a constant 4.8 MeV energy.

Circuit branch 422 provides a lower level discriminator by utilization of the discriminator 442. This discriminator is set to eliminate small pulses as seen by photomultiplier tube 402a.

A narrow window is set in the circuit branch 424 to insure that the glass event indeed takes place. Thus, the single channel analyzer 452 is set rather narrowly around the expected 4.8 MeV glass capture peak event. The final branch 426 utilizes a lower level discriminator 462 to determine if a light pulse is seen by photomultiplier 402b. Since photomultiplier 402b sees only glass light, branch 426 thus provides the means to differentiate between light pulses from the glass and plastic scintillators. A glass capture event results in the simultaneous pulses from discriminator 462 and single-channel analyzer 452, and coincidence unit 470 will give no output unless these pulses occur simultaneously, e.g. within a predetermined coincidence window.

The gates and delays 454 and 464 are set with widths of 25 $\mu$s and 0 delay and provide the coincidence pulses for coincidence unit 470. Gate and delay 446 gives logic pulse of width 4 $\mu$s with 25 $\mu$s delay (thus producing a logic delayed electrical signal) and is fed into the linear input of coincidence unit 470.

The narrow (4 $\mu$s) output of the coincidence 470 is fed as a gate to the analog converter 436. Thus, when the coincidence gate from the coincidence circuit 470 is generated, the analogue input signal to the analogue to digital converter 436 must correspond to a plastic event which is followed by a confirmed neutron capture in the Li-6 glass. The delay of analogue delay 434, which produces an analog delayed electrical signal, is selected such that the linear pulse falls within the 4 $\mu$s wide gate pulse time.

Fourth Embodiment

FIGS. 11A and 11B 11C and 12 correspond to a fourth embodiment of the invention. This fourth embodiment is similar to the embodiment shown in FIG. 9A, 9B and 10.

In FIG. 11A–C, photomultiplier tube 402a is arranged to be receptive only to the light from the plastic scintillator 404, and photomultiplier 402b is arranged to be sensitive only to the light from the glass plates 406. Thus, an additional reflecting surface 480 is provided at the surface of glass plates 406 closest to the photomultiplier tube 402a in order to reflect any light generated from the glass plates 406 from entering the photomultiplier tube 402a.

FIGS. 11B and 11C show cross sectional views of FIG. 11A wherein different arrangements of the glass plates 406 and plastic scintillators 404 are shown. The embodiment shown in FIG. 11C takes advantage of the fact that the photomultiplier tubes are of cylindrical cross section so as to optimize the interface region between the glass and the surface of the photomultiplier tubes.

Figure 12:
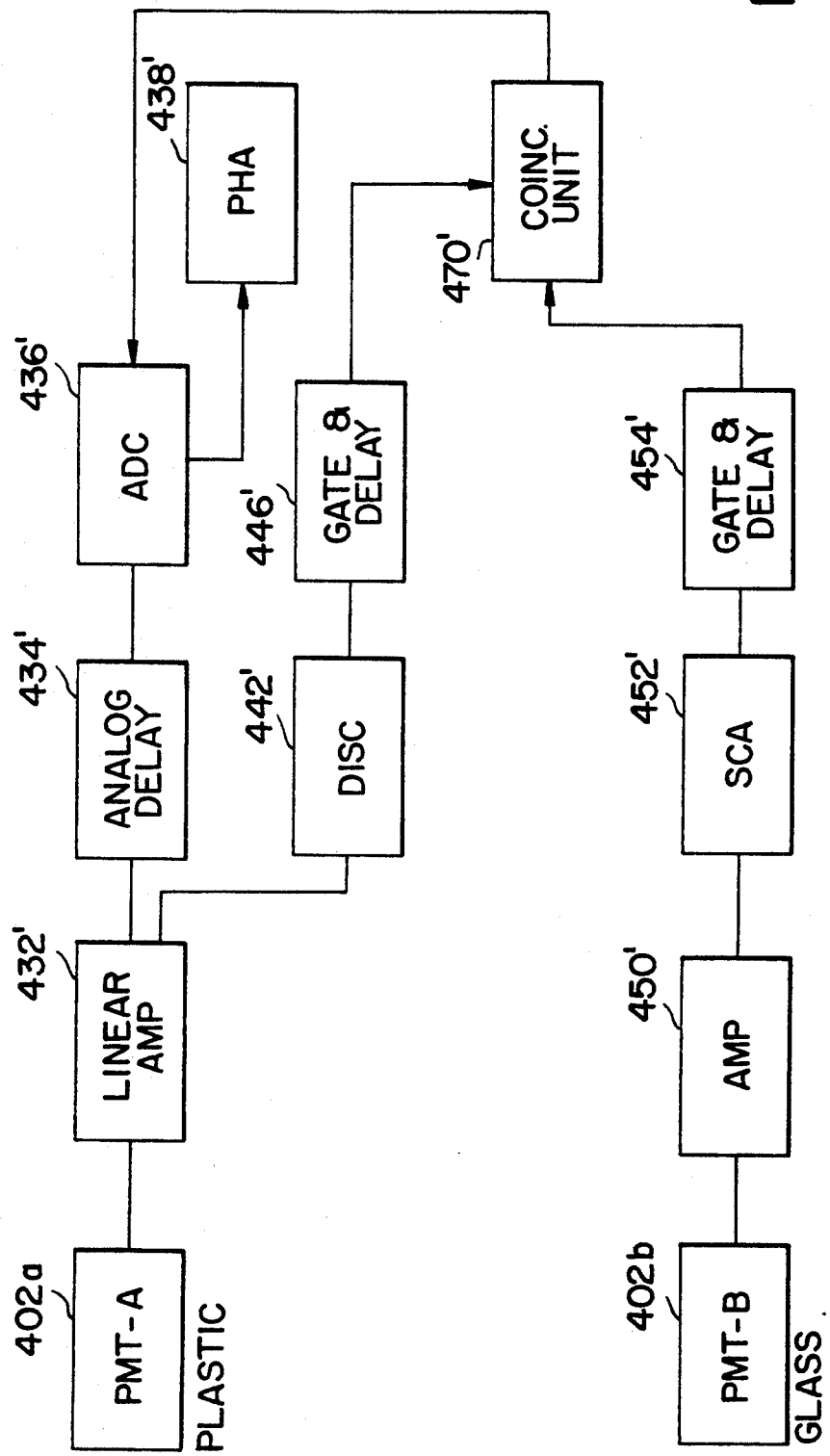
FIG. 12 shows electronic circuitry for utilization in the fourth embodiment of the invention.

FIG. 12 illustrates the electronics of the fourth embodiments of the invention. The circuitry shown in FIG. 12 is similar to that in FIG. 10 but omits the last circuit branch 426 and several other elements. Elements similar to those in FIG. 10 are labelled with a corresponding prime number. The lower circuit branch 426 is not needed because in this embodiment there is no need to confirm by a separate circuit (426) that the light did not arise from the plastic scintillator 404.

In the embodiment of FIG. 12, the output of linear amplifier 432' is fed directly to the discriminator 442' as well as to the analogue delay 434'. Again, the discriminator 442' provides a means to eliminate small pulses from the plastic scintillator. Single channel analyzer 452' again sets a peak around the 4.8 MeV neutron capture events which occur in the glass.

The timing relationships of this fourth embodiment are identical to those described for the previous (third) embodiment.

Fifth Embodiment

All of the embodiments described above may alternately be utilized in conduction with a waveform digitizer to record all pertinent information from each event. In utilizing the digitizer, a detailed analysis of the events is done by means of a computer after the data collection is complete. In such cases, the electronics needed for screening the incoming pulses is greatly reduced and simplified. Direct storage of the photomultiplier tube analog signals is done by the waveform digitizer. The advantage of the use of a waveform digitizer is that all pulse characteristics are stored and subject to further detailed analysis which may be done off-line. For example, pulse shape, area and time of occurrence are all preserved for future analysis.

Figure 13:
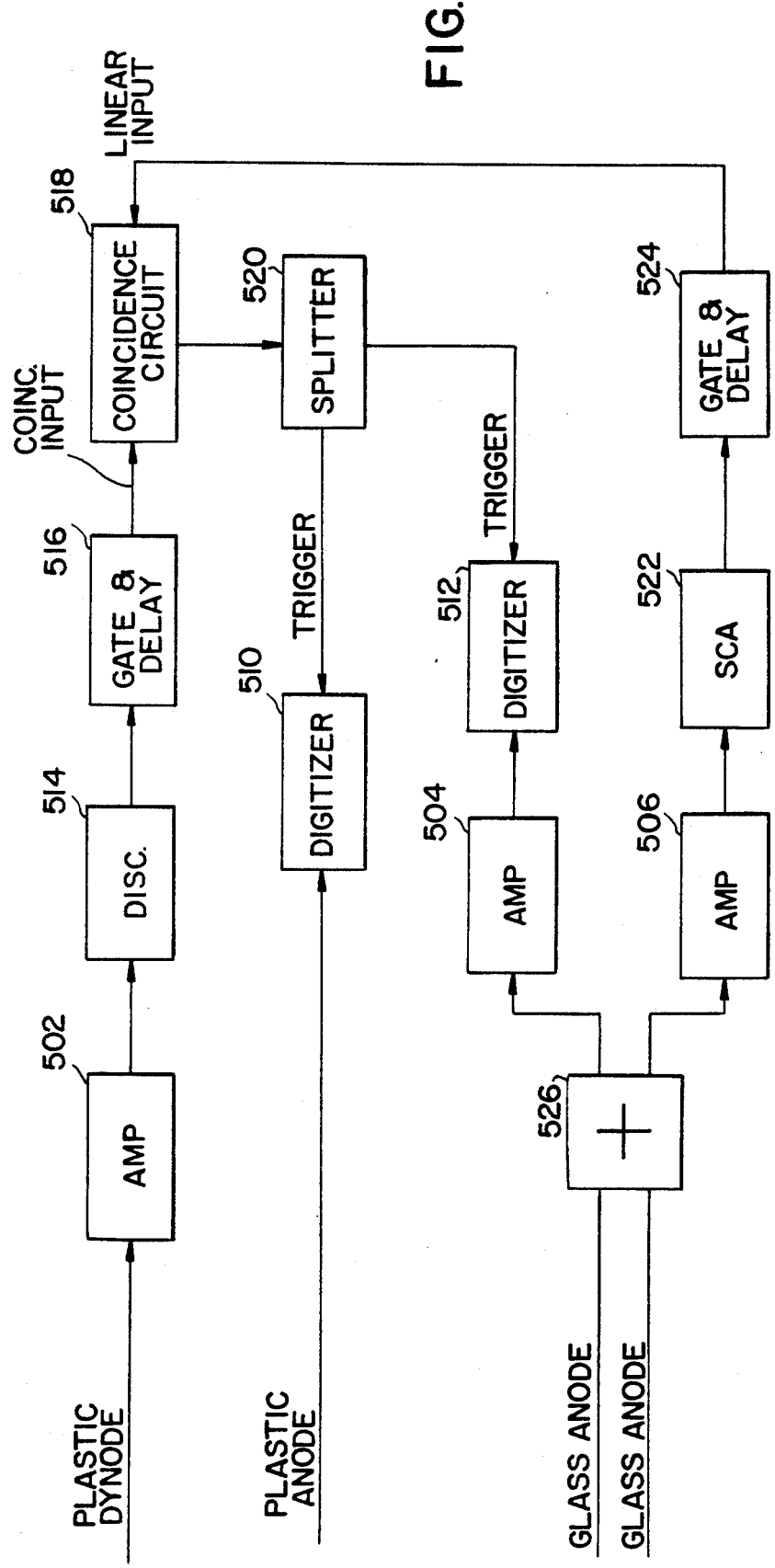
FIG. 13 shows electronic circuitry for utilization in the fifth embodiment of the invention.

A first illustration of the use of a waveform digitizer is shown in FIG. 13. The electronics shown in FIG. 13 may be employed with the measurement layout of FIGS. 1–2 as described in the first embodiment of the invention utilizing a mineral oil moderator within the region interior of the inner housing 8 and exterior to the support cylinder 12.

The circuit shown in FIG. 13 is seen to comprise amplifiers 502, 504, 506 (for example, timing filter amplifiers, EG&G/ORTEC model 474's), digitizers 510, 512 (for example, LeCroy waveform digitizers model TR8818A), lower level discriminator 514 (EG&G TD 101), gate and delay circuit 516 (model 416A), coincidence circuit 518 (model 409), splitter 520, single channel analyzer 522, gate and delay circuit 524 (model 416A), and adder 526. The dynode outputs of photomultiplier tubes 6a and 6b are summed in adder 526 and the summed pulse is split and fed to amplifiers 504 and 506. The output of amplifier 506 is fed as in input to the digitizer 512. The output of amplifier 506 is fed to single channel analyzer 522 which is set to provide a 4.8 MeV window around the neutron capture peak. The output of the single channel analyzer is passed to gate and delay circuit 524, in this case having a zero delay, which has its output fed to a linear input of coincidence circuit 518. The coincidence input of coincidence circuit 518 is supplied from the dynode of photomultiplier 6c via amplifier 502, discriminator 514, and gate and delay circuit 516 set at a relatively wide gate (approximately 50 $\mu$sec) with a delay of about $\frac{1}{8}$ $\mu$sec. The delay of delay circuit 516 is selected to be such that the signal arriving at the coincidence input to coincidence gate 518 from gate and delay 516 is a little delayed relative to the signal arriving at the linear input to coincidence circuit 518 from gate and delay circuit 524. This timing insures that cosmic ray muons are not detected. The discriminator is used to eliminate noise and low level gammas. Thus, the output of coincidence circuit 518 is only generated if the pulse from the plastic scintillator is followed by a glass pulse having a peak within the 4.8 MeV window. The output of the coincidence circuit 518 is passed to a splitter 520 which is connected to the trigger inputs of digitizers 510 and 512.

A distinct advantage of the digitizers 510 and 512 is that they can be used to store pulses which occur both before and after the receipt of the trigger pulses from coincidence circuit 518. In operation, the digitizers store pulses during a 60 $\mu$sec period before receipt of the trigger pulses and for 100 $\mu$sec after the trigger pulses. Data is digitized every 10 nsec and stored in the digitizer and subsequently dumped to a memory device, such as the memory of a computer, not shown.

Since the digitizer operates to digitize and store (in conjunction with the memory device) data characterizing each event, the data may be analyzed to determine pulse characteristics such as pulse shape, pulse area and timing. The software program designed to analyze the data can perform any number of appropriate algorithms. For example, the analyzing program may look for a change in amplitude of successive data points beyond a preset minimum, and retain only the data points for a predetermined time after such change, e.g., 1 μsec thereafter (100 data points at 10 nsec intervals). Flat data on both sides of the amplitude change may be discarded to save memory storage. The remaining data of interest may then be analyzed to determine the area of the pulses, the number of the pulses within certain time periods and the like. In this manner the data may be analyzed for both spectrometer (energy information) and pulse mode (number of neutrons in a neutron burst) applications.

Sixth Embodiment

Figure 14:
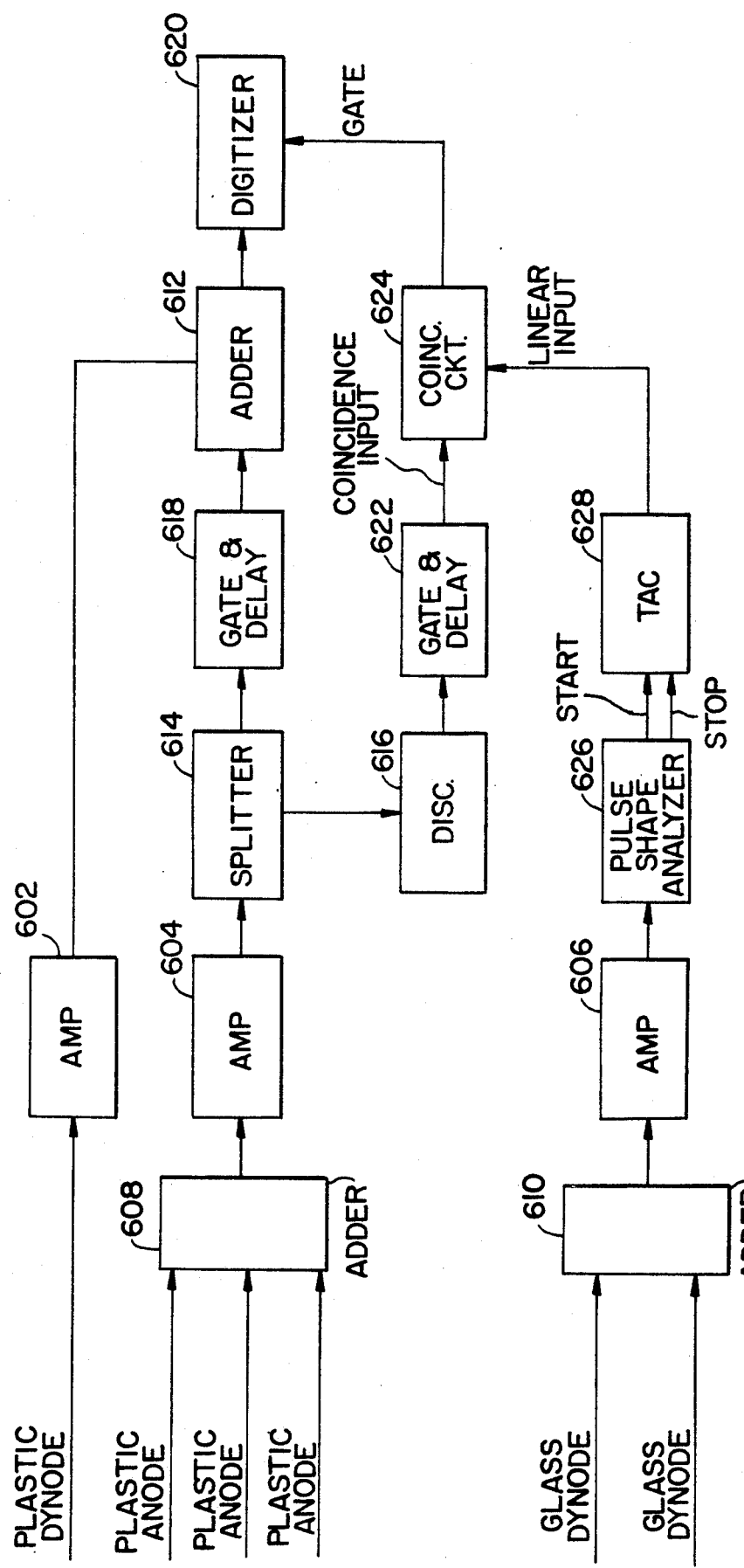
FIG. 14 shows electronic circuitry for utilization in the sixth embodiment of the invention.

A second illustration of the use of the waveform digitizer is shown in FIG. 14. The electronics shown in FIG. 14 may be employed with the measurement layout of FIGS. 1–2 as described in the second embodiment of the invention utilizing an organic scintillator 112 so as to enable spectrometer (energy) measurements. FIG. 14 is seen to comprise amplifiers 602, 604, 606 (for example, timing filter amplifiers EG&G/ORTEC 474), adders 608, 610, 612, splitter 614, discriminator 616 (for example, EG&G/ORTEC 584), delay 618 (for example, EG&G/ORTEC 427A), digitizer 620, gate and delay circuit 622 (model 416A), coincidence circuit 624 (model 409), pulse shape analyzer/single channel analyzer 626 (model 552) and time-to-amplitude converter (TAC) 628 (for example, EG&G/ORTEC 567). The anodes of all three photomultiplier tubes 6a, 6b, 6c are summed in adder 608 and amplified by amplifier 604. The amplified signal is split by splitter 614, and one pulse is sent to delay 618 where it is delayed for about 2 μsec, and the delayed signal is then fed to adder 612. The second input of adder 612 is supplied from the dynode of the photomultiplier tube 6c via amplifier 602. This pulse serves as a marker to identify the pulses which follow as valid pulses in that they are preceded by a pulse from the plastic scintillator 14. The recognition of the marker pulse is made in the analyzing software, and it is easy to recognize since it is stored as a positive pulse whereas the anode signals conveying the energy information to be analyzed are stored as negative pulses. Absent the marker pulse it would be difficult to know whether the event being analyzed resulted from a neutron originating in the central bore 16 since the plastic signal of the photomultiplier 6c is summed in the adder 608 with the glass and liquid scintillator signals obtained from the anodes of photomultipliers 6a and 6b.

The advantage in using the inverted marker pulse from amplifier 602 is that the background rate is reduced relative to the internally generated signal. Only events that yield a signal from the plastic scintillator are counted as valid events.

The output of the adder 612 is fed to digitizer 620. The trigger signal required for data storage (storing data 60 μsec before the trigger and 100 μsec thereafter) is supplied from the output of coincidence circuit 624. The coincidence input of coincidence circuit 624 is supplied from splitter 614 via a fast discriminator 616 and gate and delay circuit 622. The gate and delay 622, like gate and delay 516 of FIG. 13, is set wide (50 μsec) and with a slight delay (about ⅓ μsec) so that the coincidence input to coincidence circuit 624 (from gate and delay circuit 622) is slightly delayed relative to the linear input (from TAC 628).

The linear input of coincidence circuit 624 is supplied from the output of adder 610 via amplifier 606, pulse shape analyzer 626, and TAC 628. The analyzer 626 sets a window around the neutron capture event at 4.8 MeV in the Li-6 glass and provides pulse shape discrimination by providing two outputs at the 90% and 10% marks on the falling edge of the pulse. These two outputs are fed to the TAC 628 which has a built in discriminator so that the output of the TAC 628 is provided only for pulses meeting a predetermined decay time characteristic of the neutron capture event in Li-6 glass. In this manner, the trigger signal to the digitizer 620 is provided only for a confirmed glass event.

The data analysis of the data digitized by the digitizer 620 may be the same as that used in the pulse mode version of FIG. 13 described above.

The invention has been described in reference to preferred embodiments but additional modifications and improvements will be apparent to those of skill in the art, and the invention is intended to cover such modifications and improvements which come within the scope of the appended claims.

What is claimed is:

1. A neutron detector comprising:
   a. a first scintillating material producing a first electromagnetic radiation pulse upon interaction with each of one or more incident neutrons;
   b. a second scintillating material producing a second electromagnetic radiation pulse upon interaction with each of said one or more incident neutrons, said second scintillating material producing, with each interaction, said second electromagnetic pulse of a distinct energy corresponding to neutron capture events within said second scintillating material;
   c. said second scintillating material optically separated from said first scintillating material so that electromagnetic radiation pulses generated in one of said scintillating materials are not transmitted to the other of said first and second scintillating materials;
   d. a first detector device positioned to receive at least said first electromagnetic radiation pulse and generating a first electrical signal corresponding thereto;
   e. a second detector device positioned to receive at least said second electromagnetic radiation pulse and generating a second electrical signal corresponding thereto;
   f. an electronic circuit responsive to a coincidence detection of said first and second electrical signals, said electronic circuit storing information for determining at least one of the energy or number of said incident neutrons corresponding to said coincidence detection.

2. A neutron detector as recited in claim 1, wherein said electronic circuit stores information for determining the number of incident neutrons, a plurality of neutrons forming a neutron burst.

3. A neutron detector as recited in claim 2, wherein said electronic circuit comprises:

a. a coincidence circuit having first and second input terminals and an output terminal, said coincidence circuit generating a coincidence signal at said output terminal upon receipt of electrical signals within a predetermined time window at said first and second input terminals;

b. a first circuit branch connecting said first detector device to said first input terminal of said coincidence circuit, said first circuit branch including a delay circuit for delaying said first electrical signals with respect to said second electrical signals;

c. a second circuit branch connecting said second detector device to said second input terminal of said coincidence circuit, said second circuit branch including discrimination means for passing only ones of said second electrical signals having a magnitude meeting a preset amplitude criteria; and d. a data storage device responsive to said coincidence signal and to said second electrical signals for storing data indicative of the number of neutrons within a neutron burst.

4. A neutron detector as recited in claim 3, wherein said data storage device includes a multichannel scalar having a first and second input terminal, said multichannel scalar storing information indicative of the time period between an electrical signal received on said first input terminal and each electrical signal received on said second input terminal; and wherein said electronic circuit further includes:

a. means for connecting said coincidence signal to said first input terminal of said multichannel scalar; and b. a shift register, positioned in said second circuit branch, and responsive to said ones of said second electrical signals passing through said discrimination means, said shift register generating an output signal which is connected to said second input terminal of said multichannel scalar.

5. A neutron detector as recited in claim 4, wherein said second scintillating material comprises Li-6 glass and said discrimination means passes only said second electrical signals within an amplitude window corresponding to an energy of about 4.8 MeV associated with thermal neutron capture within said Li-6 glass.

6. A neutron detector as recited in claim 5, wherein said detector includes a moderator positioned at least between said first and second scintillating materials for thermalizing neutrons passing from said first scintillizing material to said second scintillating material.

7. A neutron detector as recited in claim 3, wherein said second scintillating material comprises at least one Li-6 glass plate.

8. A neutron detector as recited in claim 7, wherein said second scintillating material comprises a plurality of Li-6 glass plates surrounding said first scintillating material.

9. A neutron detector as recited in claim 8, wherein said first scintillating material comprises an organic scintillating material having a cavity for housing a neutron source generating said neutron burst.

10. A neutron detector as recited in claim 7, wherein said first scintillating material has a cavity for housing a neutron source.

11. A neutron detector as recited in claim 10, wherein said first scintillating material comprises an organic scintillating material.

12. A neutron detector as recited in claim 3, wherein said first scintillating material comprises an organic scintillating material having a cavity for housing a neutron source generating said neutron burst.

13. A neutron detector as recited in claim 12, wherein said second scintillating material comprises Li-6 glass and said discrimination means passes only said second electrical signals within an amplitude window corresponding to an energy of about 4.8 MeV associated with thermal neutron capture within said Li-6 glass.

14. A neutron detector as recited in claim 13, wherein said detector includes a moderator positioned at least between said first and second scintillating materials for thermalizing neutrons passing from said first scintillizing material to said second scintillating material.

15. A neutron detector as recited in claim 3, wherein said second scintillating material comprises Li-6 glass and said discrimination means passes only said second electrical signals within an amplitude window corresponding to an energy of about 4.8 MeV associated with thermal neutron capture within said Li-6 glass.

16. A neutron detector as recited in claim 15, wherein said detector includes a moderator positioned at least between said first and second scintillating materials for thermalizing neutrons passing from said first scintillating material to said second scintillating material.

17. A neutron detector as recited in claim 3, wherein said first circuit branch includes discrimination means for passing only ones of said first electrical signals having a magnitude meeting a preset amplitude criteria.

18. A neutron detector as recited in claim 17, wherein said discrimination means in said first circuit branch passes only ones of said first electrical signal which have an amplitude above a predetermined minimum value.

19. A neutron detector as recited in claim 3, wherein said second scintillating material comprises Li-6, and said detector includes a moderator positioned at least between said first and second scintillating materials for thermalizing neutrons passing from said first scintillating material to said second scintillating material.

20. A neutron detector as recited in claim 3, wherein said first scintillating material comprises an organic scintillator and said second scintillating material comprise a plurality of Li-6 glass plates, and wherein said detector further includes a liquid moderator in which said glass plates are immersed.

21. A neutron detector as recited in claim 1, wherein said first detector device comprises a photomultiplier tube.

22. A neutron detector as recited in claim 1, wherein said second detector device comprises a plurality of photomultiplier tubes.

23. A neutron detector as recited in claim 1, further comprising a moderator positioned at least between said first and second scintillating materials.

24. A neutron detector as recited in claim 1, wherein said second scintillating material comprises Li-6, and said detector includes a moderator positioned at least between said first and second scintillating materials for thermalizing neutrons passing from said first scintillating material to said second scintillating material.

25. A neutron detector as recited in claim 19, wherein said electronic circuit comprises a first waveform digitizer.

26. A neutron detector as recited in claim 25, wherein said electronic circuit further comprises:

first circuit means for analyzing said second electronic signal for passing only ones of said second electronic signal meeting a predetermined minimum and maximum amplitude criteria; and second circuit means responsive to said first circuit means for generating a trigger signal for triggering said first waveform digitizer only when said first electronic signal precedes said second electronic signal within a preset time window.

27. A neutron detector as recited in claim 26, wherein said electronic circuit stores information for determining the number of incident neutrons.

28. A neutron detector as recited in claim 27, wherein said electronic circuit comprises a second waveform digitizer, said first waveform digitizer connected to receive said first electronic signal and for digitizing same in response to said trigger signal and said second waveform digitizer connected to receive said second electronic signal and for digitizing same in response to said trigger signal.

29. A neutron detector as recited in claim 1, wherein said electronic circuit comprises a waveform digitizer.

30. A neutron detector as recited in claim 1, wherein said electronic circuit is responsive to said first and second electrical signals for storing information for determining the energy of said incident neutrons.

31. A neutron detector as recited in claim 30, wherein said first detector device receives both said first and second electromagnetic radiation pulses and said second detector device receives only said second electromagnetic radiation pulse.

32. A neutron detector as recited in claim 31, wherein said second scintillating material comprises Li-6.

33. A neutron detector as recited in claim 32, wherein said electronic circuit comprises a discrimination means responsive to said second electrical signal for passing only ones of said second electrical signals which meet a predetermined amplitude criteria.

34. A neutron detector as recited in claim 33, wherein said discrimination means comprises a lower level discriminator for passing only ones of said first electrical signals above a preset minimum amplitude level.

35. A neutron detector as recited in claim 34, wherein said electronic circuit further comprises:

a summer for adding said first and second electronic signals and producing a summed signal;

a single channel analyzer responsive to said summed signal for passing only ones of said summed signals above a preset minimum amplitude level and below a preset maximum amplitude, said minimum and maximum amplitudes defining a preset window;

a coincidence circuit responsive to said ones of said summed signals from said summer and to said ones of said first electrical signals from said discrimination means for generating a coincidence output signal; and signal storing means responsive to at least said first electrical signal and to said coincidence signal for storing information for determining the energy of said incident neutrons.

36. A neutron detector as recited in claim 35, wherein said preset amplitude window is set around a 4.8 MeV peak resulting from thermal neutron capture in Li-6.

37. A neutron detector as recited in claim 36, wherein said electronic circuit further comprises means for delaying said first electrical signal prior to feeding same to said signal storing means.

38. A neutron detector as recited in claim 37, wherein said signal storing means comprises an analog-to-digital converter coupled to a pulse height analyzer.

39. A neutron detector as recited in claim 38, wherein said first and second detector devices comprise photomultiplier tubes.

40. A neutron detector as recited in claim 39, wherein said first scintillating material comprises an organic scintillator.

41. A neutron detector as recited in claim 35, wherein said first scintillating material comprises an organic scintillator.

42. A neutron detector as recited in claim 33, wherein said electronic circuit comprises delay means for delaying said first electrical signal relative to said second electrical signal.

43. A neutron detector as recited in claim 42, wherein said second scintillating material comprises an organic scintillator.

44. A neutron detector as recited in claim 42, wherein said first and second detector devices each comprise a photomultiplier tube, and wherein said second scintillating material comprises Li-6 glass plates alternating between regions of said first scintillating material, said first and second scintillating materials positioned between said photomultiplier tubes.

45. A neutron detector as recited in claim 44, wherein said second scintillating material comprises an organic scintillator.

46. A neutron detector as recited in claim 45, wherein said organic scintillating comprises a plastic scintillator.

47. A neutron detector as recited in claim 46, wherein said photomultiplier tubes have a circular detecting surface adjacent said first and second scintillating materials and wherein said plastic scintillator and said Li-6 glass plate are at least partially arcuate.

48. A neutron detector as recited in claim 30, wherein said electronic circuit comprises a waveform digitizer.

49. A neutron detector as recited in claim 48, wherein said electronic circuit further comprises:

first circuit means for analyzing said second electronic signal for passing only ones of said second electronic signal meeting a predetermined minimum and maximum amplitude criteria; and second circuit means responsive to said first circuit means for triggering said waveform digitizer only when said first electronic signal precedes said second electronic signal within a preset window.

50. A neutron detector as recited in claim 49, wherein said electronic circuit stores information for determining the energy of said incident neutrons.

51. A neutron detector as recited in claim 50, wherein said waveform digitizer is connected to receive a signal representative of the sum of said first and second electronic signals.

52. A neutron detector as recited in claim 51, wherein said second detector device comprises a first and second photomultiplier tube.

53. A neutron detector as recited in claim 52, wherein said first detector device comprises a photomultiplier tube.

54. A neutron detector as recited in claim 1, wherein said electronic circuit includes circuit means operative on said second electrical signal for determining the energy thereof to provide a confirmation signal that said second electrical signal corresponds to a neutron capture event, wherein said electronic circuit stores said information in response to said first electrical signal and said confirmation signal.

55. A neutron detector as recited in claim 54, wherein said electronic circuit includes a coincidence unit having a signal input receiving a representation of said first electrical signal and a coincidence input receiving a representation of said confirmation signal, said electronic circuit storing said information only upon the coincidence of said signals received at said signal and coincidence inputs of said coincidence unit.

56. A neutron detector comprising:
   a. a first scintillating material producing a first electromagnetic radiation pulse upon interaction with each of one or more incident neutrons;
   b. a second scintillating material producing a second electromagnetic radiation pulse upon interaction with each of said one or more incident neutrons, said second scintillating material being in the form of an at least one Li-6 glass plate, said second electromagnetic radiation pulse produced by thermal neutrons in said at least one Li-6 glass plate;
   c. said second scintillating material being optically separated from said first scintillating material so that electromagnetic radiation pulses generated in one of said first and second scintillating materials are not transmitted to the other of said first and second scintillating materials;
   d. a first detector device positioned to receive at least said first electromagnetic radiation pulse and generating a first electrical signal corresponding thereto;
   e. a second detector device positioned to receive at least said second electromagnetic radiation pulse and generating a second electrical signal corresponding thereto; and
   f. an electronic circuit responsive to said first and second electrical signals, said electronic circuit including:
      1) a first delay device responsive to said first electrical signal for delaying said first electrical signal relative to said second electrical signal and for producing a logic delayed first electrical signal;
      2) a coincidence circuit responsive to said logic delayed first electrical signal and said second electrical signal, said coincidence circuit generating a coincidence signal; and
      3) means responsive to said coincidence signal and to at least one of said first and second electrical signals for storing information corresponding to at least one of the energy or number of said incident neutrons.

57. A neutron detector as recited in claim 56, wherein said electronic circuit comprises a second delay device responsive to said first electrical signal for delaying said first electrical signal relative to said second electrical signal and for producing an analog delayed first electrical signal and wherein said storing means is responsive to said analog delayed first electrical signal for storing information corresponding to the energy of said incident neutrons.

58. A neutron detector as recited in claim 57, wherein said storing means comprises an analog-to-digital converter coupled to a pulse height analyzer.

59. A neutron detector as recited in claim 58, wherein said electronic circuit further comprises a discrimination circuit responsive to said first electrical signal for passing only ones of said first electrical signal meeting a preset amplitude criteria.

60. A neutron detector as recited in claim 58, wherein said first detector device is responsive to said first and second electromagnetic radiation pulses and generates first sum electrical signals being the sum of said first and second electrical signals as detected in said first detector device, and wherein said second detector device is responsive to only said second electromagnetic radiation pulse and generates said second electrical signals, wherein said electronic circuit further comprises:
   a. a first discrimination circuit responsive to said first sum electrical signals for passing only ones of said first sum electrical signals meeting a preset minimum amplitude criteria;
   b. said first delay device producing said logic delayed first electrical signal in response to said electrical signals passing through said first discrimination circuit;
   c. a summer for summing said first sum electrical signals and said second electrical signals for producing second sum electrical signals;
   d. a second discrimination circuit responsive to said second sum electrical signals for passing only ones of said second sum electrical signals meeting a predetermined energy window around a 4.8 MeV peak associated with neutron capture in Li-6;
   d. a second delay device responsive to said second sum electrical signals passing through said second discrimination circuit said second delay device producing a first coincidence input signal;
   e. a third discrimination circuit responsive to said second electrical signals from said second detector device for passing only ones of said second electrical signals above a predetermined minimum;
   f. a third delay device responsive to signals passing through said third discrimination circuit, said third delay device producing a second coincidence input signal; and
   g. said coincidence circuit responsive to simultaneous receipt, within a coincidence window, of said logic delayed first electrical signal and to said first and second coincidence input signals, and generating said coincidence signal in response thereto.

61. A neutron detector as recited in claim 58, wherein said first detector device is responsive to only said first electromagnetic radiation pulses and generates said electrical signals, and wherein said second detector device is responsive to only said second electromagnetic radiation pulse and generates said second electrical signals, wherein said electronic circuit further comprises:
   a. a first discrimination circuit responsive to said first sum electrical signals for passing only ones of said first electrical signals meeting a preset minimum amplitude criteria;
   b. said first delay device producing said logic delayed first electrical signal in response to said electrical signals passing through said first discrimination circuit;
   c. a second discrimination circuit responsive to said second electrical signals for passing only ones of said second sum electrical signals meeting a predetermined energy window around a 4.8 MeV peak associated with neutron capture in Li-6;
   d. a second delay device responsive to said second electrical signals passing through said second discrimination circuit said second delay device producing coincidence input signals; and
   e. said coincidence circuit responsive to simultaneous receipt, within a coincidence window, of said logic delayed first electrical signals and to said coincidence input signals, and generating said coincidence signal in response thereto.

62. A neutron detector comprising:
   a. a first scintillating material producing a first electromagnetic radiation pulse upon interaction with each of one or more incident neutrons;
   b. a second scintillating material producing a second electromagnetic radiation pulse upon interaction with each of said one or more incident neutrons;
   c. a third scintillating material producing a third electromagnetic radiation pulse upon interaction with each of said one or more incident neutrons, said third scintillating material being in the form of an at least one Li-6 glass plate, said third electromagnetic radiation pulse produced by thermal neutron capture in said at least one Li-6 glass plate;
   d. said first scintillating material being optically separated from at least said third scintillating material so that electromagnetic radiation pulses generated in one of said first and third scintillating materials are not transmitted to the other of said first and third scintillating materials;
   e. a first detector device positioned to receive said first electromagnetic radiation pulse and generating a first electrical signal corresponding thereto;
   f. a second detector device positioned to receive said second and third electromagnetic radiation pulses and generating a second electrical signal corresponding to the sum of said second and third electromagnetic radiation pulses; and
   g. an electronic circuit responsive to said first and second electrical signals for measuring at least one of the energy or number of said incident neutrons.

63. A neutron detector as recited in claim 62, wherein said electronic circuit includes:
   1) first means for summing said first and second electrical signals and for producing first and second summed signals;
   2) means for analyzing said second summed signals to produce first gate signals when the magnitude of said second summed signals are above a first predetermined level;
   3) means for delaying said first summed signals to produce delayed first summed signals;
   4) means responsive to said second electrical signal for producing second gate signals when the magnitude of said second electrical signal is above a second predetermined level;
   5) coincidence means responsive to said delayed first summed signals and simultaneous receipt, within a coincidence window, of said first and second gate signals for digitizing said delayed first summed signal and for producing digitized delayed first summed signals; and
   6) means for storing said digitized delayed first summed signals as a representation of the energy of said one or more incident neutrons.

64. A neutron detector as recited in claim 63, wherein said coincidence means includes a coincidence circuit coupled to an analog-to-digital converter.

65. A neutron detector as recited in claim 64, wherein said first scintillating material includes a cavity for containing a neutron source, and wherein said electronic circuit further includes:
   1) means responsive to said first electrical signals for analyzing said first electrical signals to produce third gate signals when the magnitude of said first electrical signals are above a third predetermined level; and
   2) said coincidence means responsive to said delayed first summed signals and simultaneous receipt, within a coincidence window, of said first, second and third gate signals for digitizing said delayed first summed signal and for producing said digitized delayed first summed signals.

* * * * *